(12) United States Patent
Pharr

(10) Patent No.: US 11,430,172 B2
(45) Date of Patent: Aug. 30, 2022

(54) GENERATION OF SAMPLE POINTS IN RENDERING APPLICATIONS USING ELEMENTARY INTERVAL STRATIFICATION

(71) Applicant: NVIDIA Corporation, Santa Clara, CA (US)

(72) Inventor: Matthew Milton Pharr, Oakland, CA (US)

(73) Assignee: NVIDIA Corporation, Santa Clara, CA (US)

( * ) Notice: Subject to any disclaimer, the term of this patent is extended or adjusted under 35 U.S.C. 154(b) by 66 days.

(21) Appl. No.: 16/714,338

(22) Filed: Dec. 13, 2019

(65) Prior Publication Data

US 2020/0193674 A1 Jun. 18, 2020

Related U.S. Application Data

(60) Provisional application No. 62/779,903, filed on Dec. 14, 2018.

(51) Int. Cl.
| | |
|---|---|
| *G06T 15/00* | (2011.01) |
| *G06T 15/06* | (2011.01) |
| *G06F 9/38* | (2018.01) |
| *G06T 15/08* | (2011.01) |
| *G06T 11/40* | (2006.01) |

(52) U.S. Cl.
CPC .......... *G06T 15/005* (2013.01); *G06F 9/3877* (2013.01); *G06T 11/40* (2013.01); *G06T 15/06* (2013.01); *G06T 15/08* (2013.01)

(58) Field of Classification Search
None
See application file for complete search history.

(56) References Cited

U.S. PATENT DOCUMENTS

| 7,830,379 | B2 * | 11/2010 | Peterson | G06T 15/005 |
| | | | | 345/426 |
| 9,396,585 | B2 * | 7/2016 | Magder | G06T 15/04 |
| 9,905,037 | B2 * | 2/2018 | Boudier | G06T 15/005 |

(Continued)

OTHER PUBLICATIONS

Christensen et al., "Progressive Multi-Jittered Sample Sequences" (Year: 2018).*

(Continued)

*Primary Examiner* — Hilina K Demeter
(74) *Attorney, Agent, or Firm* — Leydig, Voit & Mayer, Ltd.

(57) ABSTRACT

A system and method for generating a set of samples stratified across two-dimensional elementary intervals of a two-dimensional space is disclosed within the application. A computer-implemented technique for generating the set of samples includes selecting an elementary interval associated with a stratification of the two-dimensional space, initializing at least one data structure that indicates valid regions within the elementary interface based on other samples previously placed within the two-dimensional space, and generating a sample in a valid region of the elementary interval utilizing the at least one data structure to identify the valid region prior to generating the sample. In some embodiments, the data structures comprise a pair of binary trees. The process can be repeated for each elementary interval of a selected stratification to generate the set of stratified two-dimensional samples.

21 Claims, 15 Drawing Sheets

(56) References Cited

U.S. PATENT DOCUMENTS

| | | | | |
|---|---|---|---|---|
| 2007/0257935 A1* | 11/2007 | Koduri | ................... | G09G 5/001 |
| | | | | 345/611 |
| 2009/0167763 A1* | 7/2009 | Waechter | ................ | G06T 15/40 |
| | | | | 345/426 |
| 2015/0070381 A1* | 3/2015 | Lum | ....................... | G06T 11/40 |
| | | | | 345/612 |
| 2016/0314613 A1* | 10/2016 | Nowozin | ................ | G01S 7/497 |
| 2018/0096516 A1* | 4/2018 | Luebke | ................... | G06T 15/06 |

OTHER PUBLICATIONS

Shields et al., "Refined Stratified Sampling for Efficient Monte Carlo based uncertainty quantification" (Year: 2015).*

Christensen et al., "Progressive Multi-Jittered Sample Sequence" (Year: 2018).*

Naylor, "A Tutorial on Binary Space Partitioning Trees" (Year: 2005).*

Christensen, P., et al., "Progressive multi-jittered sample sequences," Eurographics Symposium on Rendering 2018, vol. 37, No. 4.

Cook, R.L., "Stochastic Sampling in Computer Graphics," ACM Transactions on Graphics vol. 5, No. 1 (Jan. 1986) pp. 51-72.

Dipp'e, M.A., et al., "Antialiasing through stochastic sampling," SIGGRAPH Computer Graphics Proceedings vol. 19, No. 3 (Jul. 22-26, 1985), 69-78.

Grunschloss, L., et al., "(t, m, s)—Nets and maximized minimum distance," In Monte Carlo and Quasi-Monte Carlo Methods 2006, Springer Berlin Heidelberg, Berlin, Heidelberg, Eds, 397-412.

Kollig, T., et al., "Efficient multidimensional sampling," Eurographics 2002, vol. 21, No. 3, 557-563.

Mitchell, D.P., "Spectrally optimal sampling for distribution ray tracing," In Proceedings of the $18^{th}$ Annual Conference on Computer Graphics and Interactive Techniques, SIGGRAPH 1991, Providence, RI, Apr. 27-30, 1991, 157-164.

Perrier, H., et al., "Sequences with low-discrepancy blue-noise 2-d projections," Computer Graphics Forum vol. 37, No. 2, 339-353, 2018.

Keller, A., "Quasi-Monte Carlo image synthesis in a nutshell," In Monte Carlo and Quasi-Monte Carlo Methods 2012, Springer.

Pharr, M., et al., "Physically Based Rendering from Theory to Implementation," Elsevier, 2016, Chapter 7 located at http://www.pbr-book.org/.

* cited by examiner

GENERATION OF SAMPLE POINTS IN RENDERING APPLICATIONS USING ELEMENTARY INTERVAL STRATIFICATION

CLAIM OF PRIORITY

This application claims the benefit of U.S. Provisional Application No. 62/779,903 titled "GENERATION OF POINTS STRATIFIED ACROSS TWO-DIMENSIONAL ELEMENTARY INTERVALS," filed Dec. 14, 2018, the entire contents of which is incorporated herein by reference.

TECHNICAL FIELD

The present disclosure relates to generating sample points. More specifically, the embodiments set forth below describe techniques for generating sample points for computer-based rendering algorithms.

BACKGROUND

Computer-based rendering algorithms can include steps involving the generation of two-dimensional (2D) sample points. For example, sample points can be warped to surfaces of light sources or reflection function distributions for use in Monte Carlo light transport algorithms. Pre-computing high-quality sample points has been shown to be a useful technique that optimizes properties of the sample points without imposing performance constraints based on resource utilization during the rendering process. The sample points should generally have an even distribution without creating regular patterns in order to optimize results. Improving the distribution of these sample points generally leads to higher-quality images. In other words, higher-quality images with reduced error can be generated using the same number of sample points, or similar quality images can be generated in less time using fewer sample points with improved distributions.

A particularly useful property to optimize point sampling is stratification across elementary intervals, which has been shown to reduce errors in Monte Carlo integration. Christensen et al. describe a technique for generating progressive multi-jittered sample sequences in "Progressive multi-jittered sample sequences," *Computer Graphics Forum* 37, 4, 21-33 (2018), which is incorporated herein in its entirety. As described therein, samples in a sequence are generated utilizing a random search of points within a square interval to generate candidates that satisfy constraints from a set of overlapping stratifications. However, as the number of generated samples increases and the range of valid locations for new samples decreases, the algorithm can result in a large number of invalid random candidates being generated before a candidate is found that satisfies all of the constraints from the other overlapping stratifications. Therefore, the length of time required to generate a fixed number of points increases significantly as the number of samples increases. Thus, there is a need for addressing these issues and/or other issues associated with the prior art.

SUMMARY

The following description describes a system and method for generating a set of samples stratified across two-dimensional elementary intervals of a two-dimensional space. In an embodiment, a computer-implemented method for generating the set of samples includes selecting an elementary interval associated with a stratification of the two-dimensional space, initializing at least one data structure that indicates valid regions within the elementary interface based on other samples previously placed within the two-dimensional space, and generating a sample in a valid region of the elementary interval utilizing the at least one data structure to identify the valid region prior to generating the sample. The at least one data structure is initialized in a memory associated with a processor. The sample is generated by the processor.

In some embodiments, the at least one data structure includes a first binary tree for a first dimension and a second binary tree for a second dimension. Each node in the binary tree represents an overlapping elementary interval in a different stratification in a set of stratifications related to the two-dimensional space. An overlapping elementary interval can be any elementary interval that includes extents that overlap with any portion of the extents of the selected elementary interval and fully overlap the extents of the selected elementary interval in one of the two dimensions.

In some embodiments, generating the sample includes traversing each of the first binary tree and the second binary tree to generate corresponding arrays of valid offsets and selecting an entry from each corresponding array of valid offsets to identify the valid region. In some embodiments, generating the sample further includes generating, either randomly or pseudo-randomly, a candidate location within the valid region. In some embodiments, generating the sample further includes generating a plurality of candidate locations in the valid region, calculating a metric value for each candidate location in the plurality of candidate location, and selecting a best candidate location from the plurality of candidate location based on the metric value as a location for the sample. In an embodiment, the metric value is calculated by determining a minimum distance between the candidate location and each sample in the zero or more other samples located within the two-dimensional space.

In some embodiments, the method further includes updating occupancy information in one or more data structures that represent a set of stratifications corresponding to a total number of samples to generate within the two-dimensional space and repeating the selecting, initializing, and generating for a different elementary interval associated with the stratification. In an embodiment, the total number of samples to generate is a power of four and the stratification corresponds with elementary intervals having equal extents in both a first dimension and a second dimension.

In some embodiments, the method further includes storing a set of samples generated for the two-dimensional space in a memory associated with a parallel processing unit and executing at least one instruction in the parallel processing unit that accesses the set of samples in the memory associated with the parallel processing unit. In an embodiment, the at least one instruction is included in an algorithm for performing a transport and lighting simulation associated with ray-traced rendering.

In some embodiments, a system is described that includes a memory and a processor coupled to the memory. The processor is configured to execute at least one instruction that causes the processor to select an elementary interval associated with a stratification of a two-dimensional space, initialize at least one data structure that indicates valid regions within the elementary interval based on zero or more other samples located within the two-dimensional space, and generate a sample in a valid region of the elementary interval utilizing the at least one data structure to identify the valid region prior to generating the sample.

In some embodiments, the processor is a central processing unit. In some embodiments, the system further includes a parallel processing unit coupled to the memory. The parallel processing unit is configured to execute at least one additional instruction that causes the parallel processing unit to access a set of samples generated for the two-dimensional samples from the memory.

In some embodiments, a non-transitory computer-readable medium is described for storing instructions that, when executed by at least one processor, cause the at least one processor to carry out operations for generating stratified two-dimensional samples. The operations include the steps of selecting an elementary interval associated with a stratification of a two-dimensional space, initializing, for the elementary interval in a memory associated with the at least one processor, at least one data structure that indicates valid regions within the elementary interval based on zero or more other samples located within the two-dimensional space, and generating, by the at least one processor, a sample in a valid region of the elementary interval utilizing the at least one data structure to identify the valid region prior to generating the sample.

DETAILED DESCRIPTION

Figure 1:
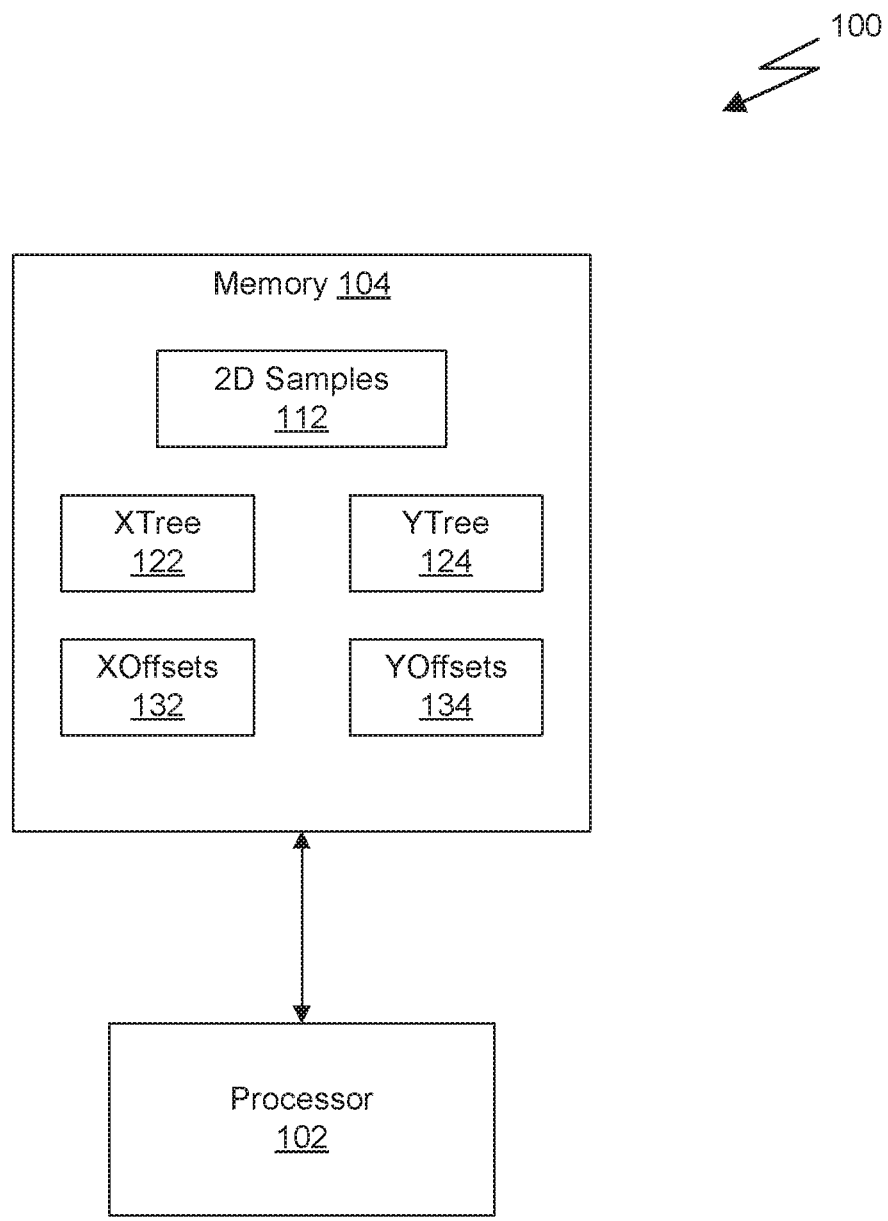
FIG. 1 illustrates a system for generating stratified two-dimensional samples, in accordance with some embodiments.

The technique for generating samples distributed in a two-dimensional space described herein builds on a single key observation of the choice for stratification of the two-dimensional space into elementary intervals. If an elementary interval is selected for which a new sample is generated, then all of the elementary intervals from other stratifications that overlap the particular elementary interval at the new sample location entirely cover the particular elementary interval in one of the two dimensions—the dimension where the length of the overlapping elementary interval is greater than the length of the corresponding dimension of the particular elementary interval. This property is inherent based on the fact that all power-of-two elementary intervals have inverse power-of-two side lengths, start at offsets that are integer multiples of their side lengths, and all have equal areas (e.g., when one side doubles the other side is halved). Intuitively, because the total area of all elementary intervals are the same, having a shorter side in one dimension necessitates a longer side in the other dimension.

From this observation it is realized that one can represent the valid regions within a particular elementary interval by representing the valid and invalid regions in each dimension independently. In other words, all overlapping elementary intervals having a narrower length in the x dimension than a particular elementary interval contribute to the definition of valid or invalid sub-ranges within the extents of the x dimension of the particular elementary interval, and all overlapping elementary intervals having a narrower length in the y dimension than the particular elementary interval contribute to the definition of valid or invalid sub-ranges within the extents of the y dimension of the particular elementary interval. In other words, if any overlapping elementary interval includes a sample location that is external to the particular elementary interval, the overlapping elementary interval will define a one-dimensional sub-range within the extents of the particular elementary interval that is invalid for a new sample point within that particular elementary interval.

It will be appreciated, therefore, that the algorithm described by Christensen et al. can be improved drastically by first defining the valid regions within an elementary interval in which a sample can be placed and then placing a sample within one of the valid regions. A data structure that defines the valid regions within the extents of the elementary interval can be initialized prior to generating the sample. After each sample is generated, data structures encoding occupancy information for the two-dimensional space can be updated to identify those elementary intervals in the set of stratifications that are occupied by the sample. The process can be repeated to generate a total number of samples desired in a particular two dimensional space.

Comparison of the two algorithms shows an approximately 40× improvement in speed when the total number of samples generated is 1,024 and an over 5,000× improvement in speed when over one million samples are generated.

FIG. 1 illustrates a system 100 for generating stratified two-dimensional samples, in accordance with some embodiments. In an embodiment, the system 100 includes a processor 102 connected to a memory 104. The processor 102 can be implemented as a central processing unit (CPU), an ARM-based processor, a microcontroller, an application specific integrated circuit (ASIC), or the like. The memory 104 is a volatile memory such as a synchronous dynamic random access memory (SDRAM) or the like. The processor 102 is configured to generate a number of data structures in the memory 104. The data structures include a two-dimensional (2D) samples data structure 112, a first binary tree 122 for a first dimension, a second binary tree 124 for a second dimension, a first offsets data structure 132 for a first dimension, and a second offsets data structure 134 for a second dimension. In an embodiment, the first dimension is an x dimension or a dimension associated with a horizontal axis of the two-dimensional space, and the second dimension is a y dimension or a dimension associated with a vertical axis of the two-dimensional space.

The processor 102 is configured to initialize the set of data structures. In one embodiment, the 2D samples data structure is an array of 2D points within the range of [0,1) in both the x dimension and the y dimension—represented herein as $[0,1)^2$. The points may be stored as a tuple (e.g., 2-tuple) of floating point values. A particular point can be stored as a first floating point element that indicates the x-coordinate for the point and a second floating point element that indicates the y-coordinate for the point. In other embodiments, the range of the two-dimensional space is not limited to the normalized range between 0 and 1 and/or the points can be stored using a different format, such as a fixed point format. For example, the range can be defined as $[-28,128)^2$ and the points can be stored in fixed point format such as 8.24 fixed point format. The remainder of this application will assume that the 2D space is normalized within the range of $[0,1)^2$.

Figure 2A:
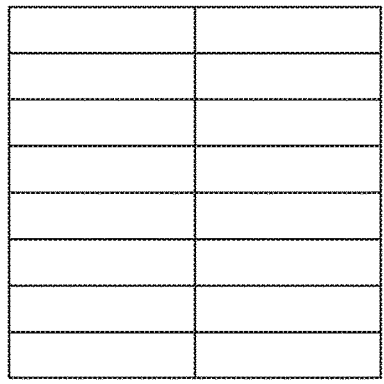
FIG. 2A illustrates a set of stratifications of the two-dimensional space, in accordance with some embodiments.
Figure 2A:
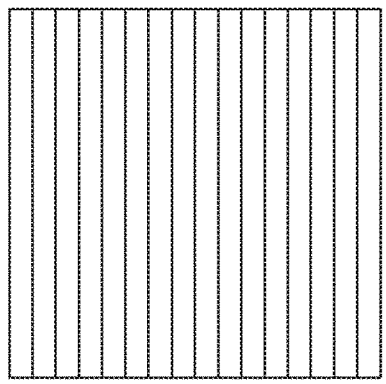
Figure 2A:
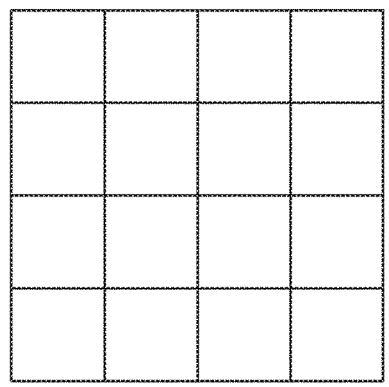
Figure 2A:
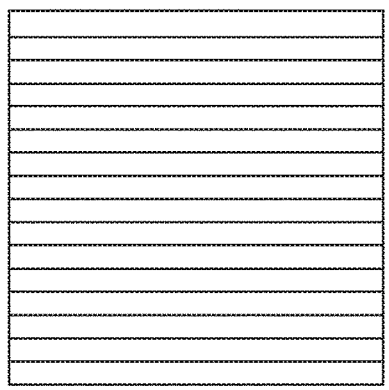
Figure 2A:
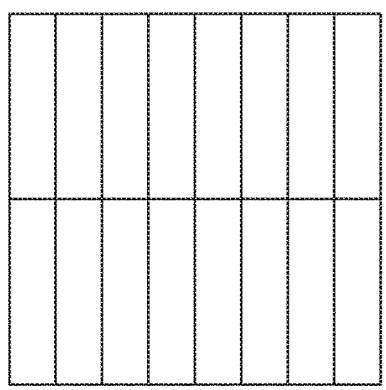

FIG. 2A illustrates a set of stratifications of the two-dimensional space, in accordance with some embodiments. As used herein, a "stratification" refers to a division of a 2D space into a number of equal sized areas, where the number of areas is equal to a power of two. Again, an optimal property of the generated samples is that the samples are well-distributed. One way to ensure distribution is to stratify a space, and then place a sample in each of the elementary intervals of the stratification. It will be appreciated that there are a number of different ways to divide a given 2D space into an equal number of areas.

As depicted in FIG. 2A, a 2D space is divided into 16 areas. In a first stratification 200, both the first dimension and the second dimension are divided equally into four elementary intervals, creating 16 regions where each region includes points with ¼ of the possible range of x-coordinates and ¼ of the possible range of y-coordinates. However, there are other equally valid stratifications where the first dimension and the second dimension are not divided into an equal number of elementary intervals.

For example, a first alternate stratification 202 divides the range of x-coordinates into 16 equal elementary intervals such that each region includes points having ¹⁄₁₆ of the possible range of x-coordinates and all of the possible range of y-coordinates. A second alternate stratification 204 divides the range of x-coordinates into 8 equal elementary intervals and divides the range of y-coordinates into 2 equal elementary intervals such that each region includes points having ⅛ of the possible range of x-coordinates and ½ of the possible range of y-coordinates. A third alternate stratification 206 divides the range of x-coordinates into 2 equal elementary intervals and divides the range of y-coordinates into 8 equal elementary intervals such that each region includes points having ½ of the possible range of x-coordinates and ⅛ of the possible range of y-coordinates. A fourth alternate stratification 208 divides the range of y-coordinates into 16 equal elementary intervals such that each region includes points having ¹⁄₁₆ of the possible range of y-coordinates and all of the possible range of x-coordinates.

Figure 2B:
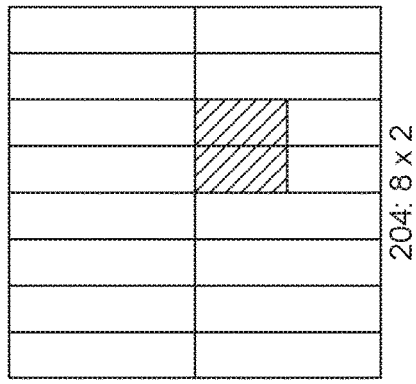
FIG. 2B illustrates a concept of overlapping elementary intervals from the set of stratifications, in accordance with some embodiments.
Figure 2B:
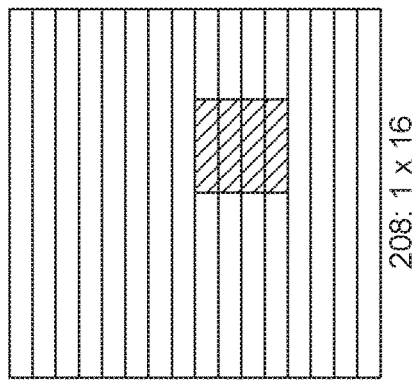
Figure 2B:
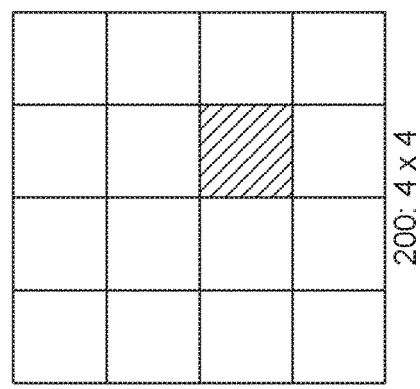
Figure 2B:
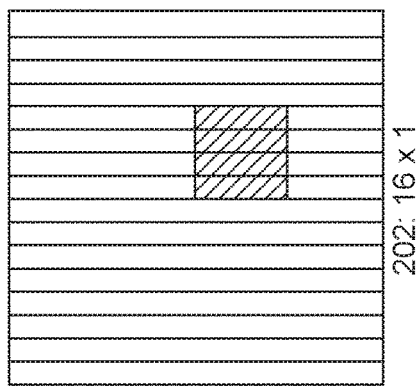
Figure 2B:
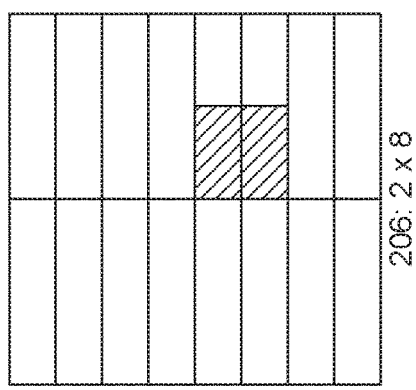

FIG. 2B illustrates a concept of overlapping elementary intervals from the set of stratifications, in accordance with some embodiments. As depicted in FIG. 2B, a particular elementary interval in the stratification 200 is indicated via cross hatching. This application can refer to elementary intervals using the following notation: $(x,y)_{n_x \times n_y}$, where x refers to an index of the elementary interval in the x dimension, y refers to an index of the elementary interval in the y dimension, $n_x$ refers to the number of elementary intervals for this particular stratification in the x dimension, and $n_y$ refers to the number of elementary intervals for this particular stratification in the y dimension. For example, the cross-hatched elementary interval in the stratification 200 can be referred to as elementary interval $(2,1)_{4\times4}$. It will be appreciated that $x=0, 1, \ldots n_x-1$ and $y=0, 1, \ldots n_y-1$, where the index increases from a minimum value to a maximum value in the range of coordinates in the 2D space.

The extents of elementary interval $(2,1)_{4\times4}$ is also shown on the other alternate stratifications 202, 204, 206, 208. In the first alternate stratification 202, elementary interval $(2,1)_{4\times4}$ overlaps elementary intervals $(8,0)_{16\times1}$, $(9,0)_{16\times1}$, $(10,0)_{16\times1}$, and $(11,0)_{16\times1}$. In the second alternate stratification 204, elementary interval $(2,1)_{4\times4}$ overlaps elementary intervals $(4,0)_{8\times2}$ and $(5,0)_{8\times2}$. In the third alternate stratification 206, elementary interval $(2,1)_{4\times4}$ overlaps elementary intervals $(1,2)_{2\times8}$ and $(1,3)_{2\times8}$. In the fourth alternate stratification 208, elementary interval $(2,1)_{4\times4}$ overlaps elementary intervals $(0,4)_{1\times16}$, $(0,5)_{1\times16}$, $(0,6)_{1\times16}$, and $(0,7)_{1\times16}$. It will be appreciated that if a sample is placed in the elementary interval $(2,1)_{4\times4}$ of the stratification 200, that same sample also occupies exactly one overlapping elementary interval in each of the other alternate stratifications.

A constraint for generating the set of samples is that the samples are distributed in a manner such that one sample is placed in each elementary interval over the entire set of stratifications. Thus, each placed sample invalidates a certain subset of the 2D space from containing other samples, where the subset of invalidity is defined as the union of the regions associated with all overlapping elementary intervals that contain the same sample.

Figure 2C:
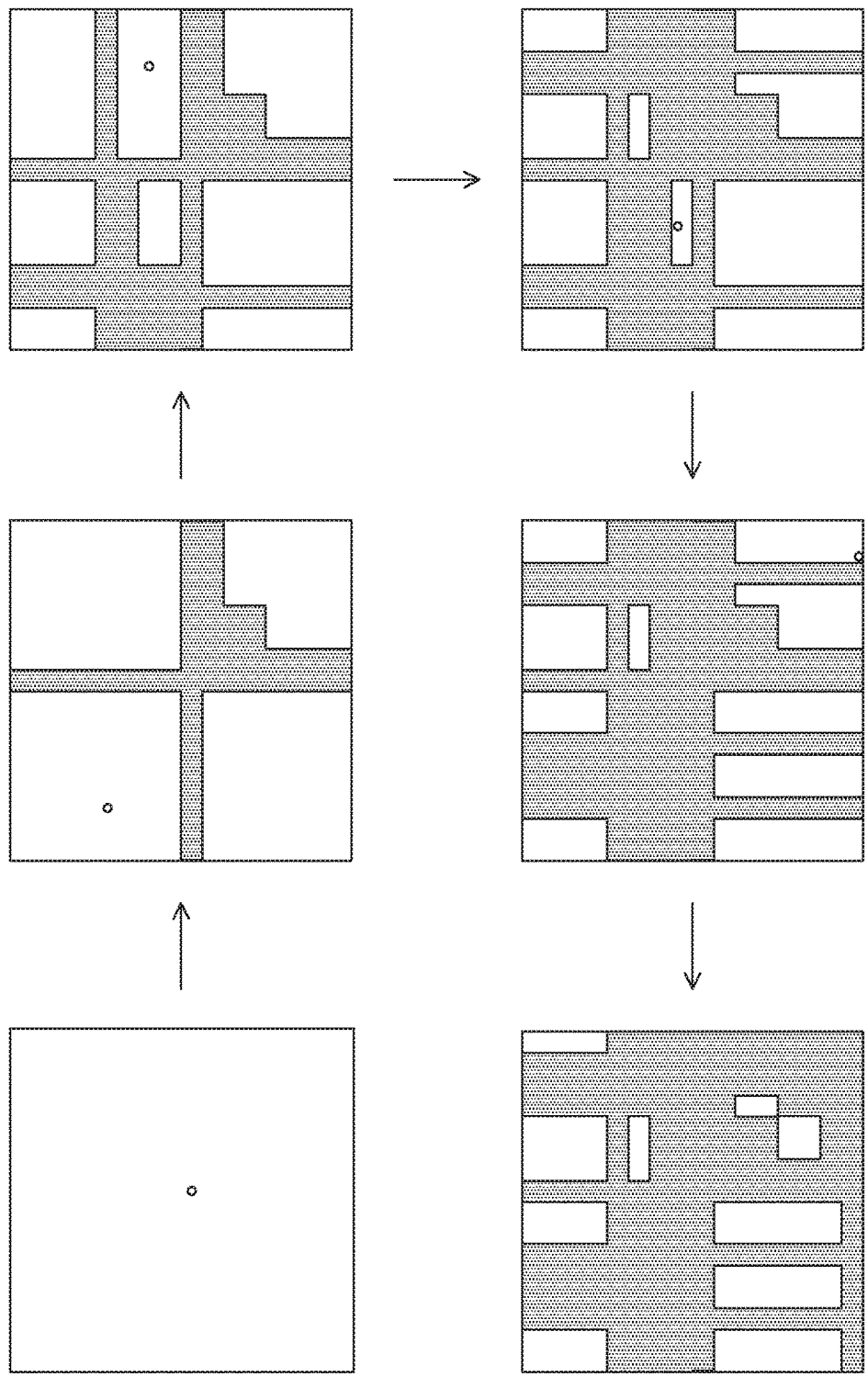
FIG. 2C is a conceptual illustration of dynamically tracking valid regions within a two-dimensional space as samples are generated, in accordance with some embodiments.

FIG. 2C is a conceptual illustration of dynamically tracking valid regions within a two-dimensional space as samples are generated, in accordance with some embodiments. A total of 16 samples are going to be generated within a space. As a first sample is randomly placed in the space, that sample invalidates approximately 18% of the area within the space from holding one of the remaining 15 samples. This 18% represents the combined area of five separate elementary intervals in the five stratifications. A second sample is randomly placed in one of the valid regions. The second sample invalidates additional area within the space. A third, fourth and fifth sample are generated in similar fashion, each sample placed invalidating additional areas within the space prior to placement of the next sample. After only 5 of the 16 total samples have been generated, approximately 70% of the available area is already invalidated and cannot hold new samples.

It will be appreciated that following the approach described by Christensen et al. where a candidate sample is randomly selected and then checked to see if the candidate falls in the invalid region, in which case the candidate is discarded and a new random candidate sample is generated, quickly becomes very inefficient as a technique for generating a number of samples (with the caveat that the number is a power of two) within the two-dimensional space because a majority of the candidates will be rejected, even after only a small number of samples are placed within the space. In other words, the flaw in the approach described by Christensen et al. is that the random generation of a candidate point does not depend on the valid or invalid regions defined by all previously place points. Since the candidate is only checked after generation, there is a lot of inefficiency introduced by randomly selecting a candidate location for a potential new sample.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

The technique for generating samples within a two-dimensional space described herein is especially useful in a variety of rendering applications including Monte Carlo integration or lighting and transport simulation. Another useful application for the samples is in collision detection algorithms. It will be appreciated that each sample is generated only after a previous sample has been placed within the space. Therefore, the algorithms for generating these points are sequential in nature and likely to be implemented within a single thread. In some cases, the distribution is optimized to include blue noise that is introduced by generating a plurality of candidate locations within a selected valid region and then selecting the best candidate location from the plurality of candidate locations based on a criterion metric, such as greatest distance from the closest sample in the set of samples already filled in the two-dimensional space. While this portion of the algorithm may lend itself to limited parallelism, in general, the benefit of a parallel processing unit for generating the set of samples may be limited. Consequently, the algorithm for generating samples will typically be implemented on a single or multi-threaded CPU rather than a GPU or other parallel processing unit.

However, once the samples have been generated, the set of samples themselves can be utilized by an algorithm that is particularly suited to parallel processing. For example, ray tracing algorithms can include lighting simulations that utilize the sample locations when performing various calculations. A large number of rays can be generated and calculated in parallel, where the calculations for each ray utilize the set of sample locations. Therefore, a description of an exemplary parallel processing unit is set forth below.

Parallel Processing Architecture

Figure 3:
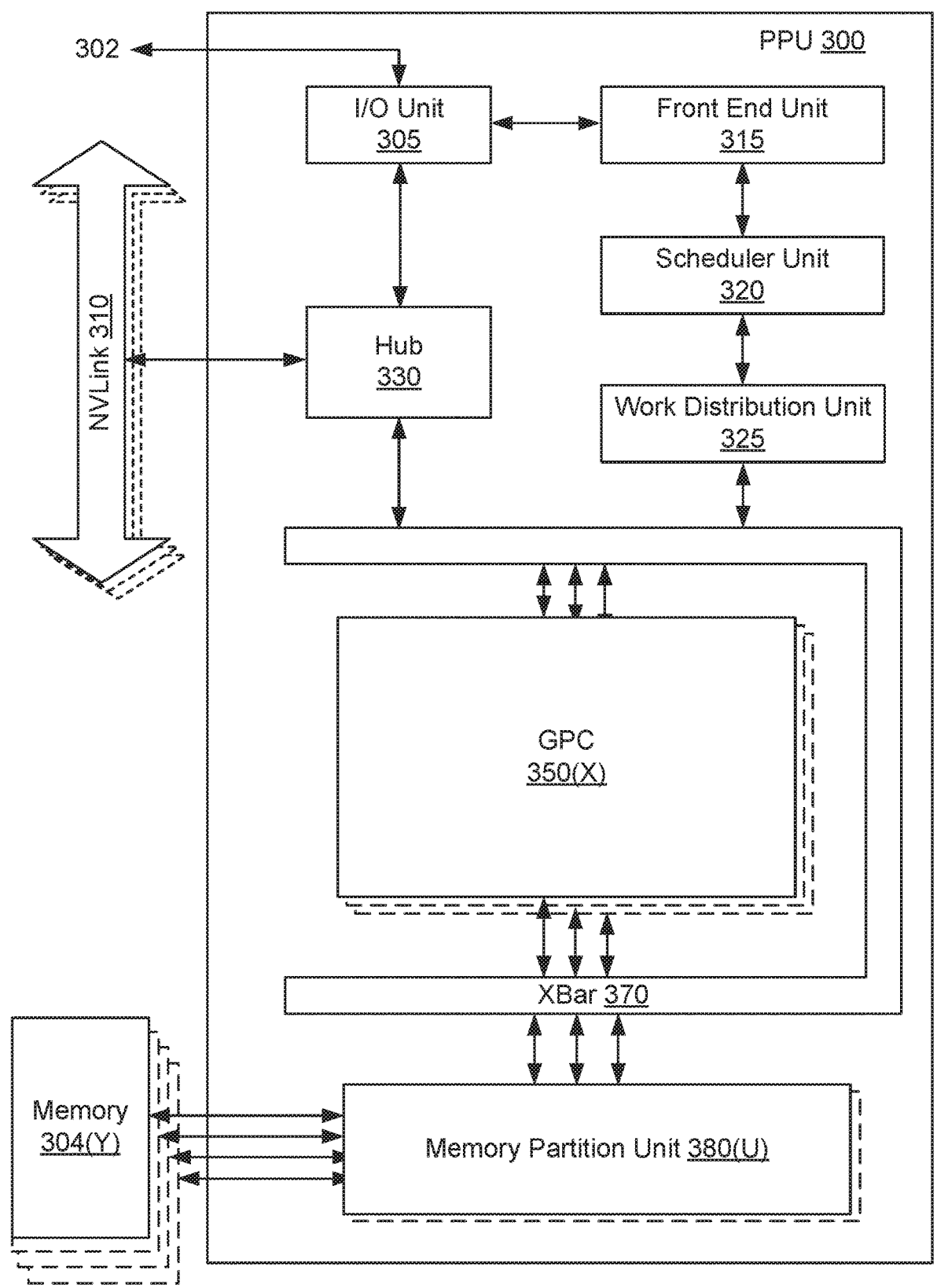
FIG. 3 illustrates a parallel processing unit, in accordance with an embodiment.

FIG. 3 illustrates a parallel processing unit (PPU) 300, in accordance with an embodiment. In an embodiment, the PPU 300 is a multi-threaded processor that is implemented on one or more integrated circuit devices. The PPU 300 is a latency hiding architecture designed to process many threads in parallel. A thread (e.g., a thread of execution) is an instantiation of a set of instructions configured to be executed by the PPU 300. In an embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 300 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 300 may be configured to accelerate thousands of High Performance Computing (HPC), data center, and machine learning applications. The PPU 300 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 3, the PPU 300 includes an Input/Output (I/O) unit 305, a front end unit 315, a scheduler unit 320, a work distribution unit 325, a hub 330, a crossbar (Xbar) 370, one or more general processing clusters (GPCs) 350, and one or more memory partition units 380. The PPU 300 may be connected to a host processor or other PPUs 300 via one or more high-speed NVLink 310 interconnect. The PPU 300 may be connected to a host processor or other peripheral devices via an interconnect 302. The PPU 300 may also be connected to a local memory 304 comprising a number of memory devices. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 310 interconnect enables systems to scale and include one or more PPUs 300 combined with one or more CPUs, supports cache coherence between the PPUs 300 and CPUs, and CPU mastering. Data and/or commands may be transmitted by the NVLink 310 through the hub 330 to/from other units of the PPU 300 such as one or more copy engines, a video encoder, a video decoder, a power management unit, etc. (not explicitly shown). The NVLink 310 is described in more detail in conjunction with FIG. 5B.

The I/O unit 305 is configured to transmit and receive communications (e.g., commands, data, etc.) from a host processor (not shown) over the interconnect 302. The I/O unit 305 may communicate with the host processor directly via the interconnect 302 or through one or more intermediate devices such as a memory bridge. In an embodiment, the I/O unit 305 may communicate with one or more other processors, such as one or more the PPUs 300 via the interconnect 302. In an embodiment, the I/O unit 305 implements a Peripheral Component Interconnect Express (PCIe) interface for communications over a PCIe bus and the interconnect 302 is a PCIe bus. In alternative embodiments, the I/O unit 305 may implement other types of well-known interfaces for communicating with external devices.

The I/O unit 305 decodes packets received via the interconnect 302. In an embodiment, the packets represent commands configured to cause the PPU 300 to perform various operations. The I/O unit 305 transmits the decoded commands to various other units of the PPU 300 as the commands may specify. For example, some commands may be transmitted to the front end unit 315. Other commands may be transmitted to the hub 330 or other units of the PPU 300 such as one or more copy engines, a video encoder, a video decoder, a power management unit, etc. (not explicitly shown). In other words, the I/O unit 305 is configured to route communications between and among the various logical units of the PPU 300.

In an embodiment, a program executed by the host processor encodes a command stream in a buffer that provides workloads to the PPU 300 for processing. A workload may comprise several instructions and data to be processed by those instructions. The buffer is a region in a memory that is accessible (e.g., read/write) by both the host processor and the PPU 300. For example, the I/O unit 305 may be configured to access the buffer in a system memory connected to the interconnect 302 via memory requests transmitted over the interconnect 302. In an embodiment, the host processor writes the command stream to the buffer and then transmits a pointer to the start of the command stream to the PPU 300. The front end unit 315 receives pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In an embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the PPU 300 to other units of the PPU 300. For example, the XBar 370 may be configured to couple the work distribution unit 325 to a particular GPC 350. Although not shown explicitly, one or more other units of the PPU 300 may also be connected to the XBar 370 via the hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the memory partition units 380, which implement a memory interface for reading and writing data to/from the memory 304. The results can be transmitted to another PPU 300 or CPU via the NVLink 310. In an embodiment, the PPU 300 includes a number U of memory partition units 380 that is equal to the number of separate and distinct memory devices of the memory 304 coupled to the PPU 300. A memory partition unit 380 will be described in more detail below in conjunction with FIG. 4B.

In an embodiment, a host processor executes a driver kernel that implements an application programming interface (API) that enables one or more applications executing on the host processor to schedule operations for execution on the PPU 300. In an embodiment, multiple compute applications are simultaneously executed by the PPU 300 and the PPU 300 provides isolation, quality of service (QoS), and independent address spaces for the multiple compute applications. An application may generate instructions (e.g., API calls) that cause the driver kernel to generate one or more tasks for execution by the PPU 300. The driver kernel outputs tasks to one or more streams being processed by the PPU 300. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 5A.

Figure 4A:
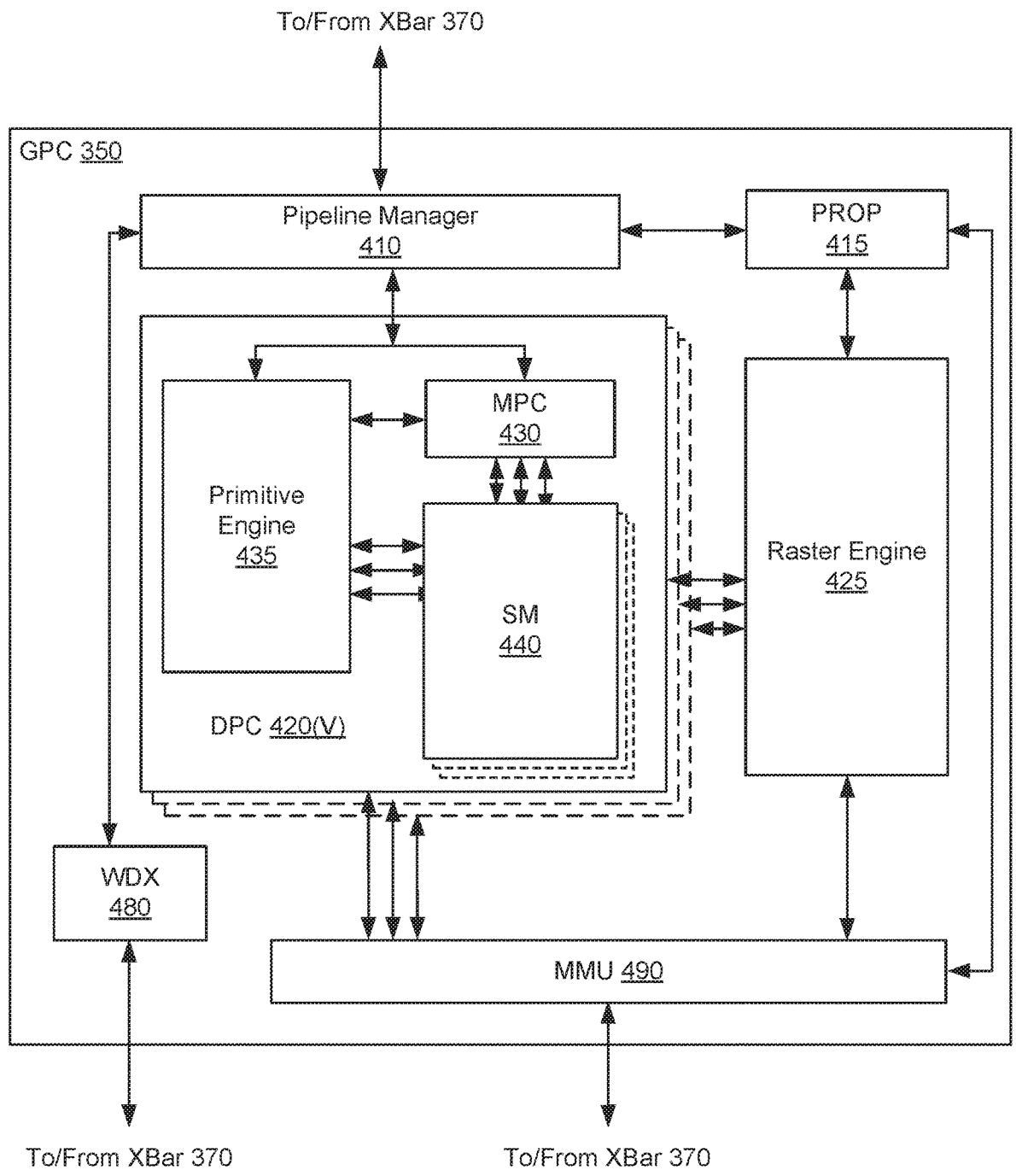
FIG. 4A illustrates a general processing cluster within the parallel processing unit of FIG. 3, in accordance with an embodiment.

FIG. 4A illustrates a GPC 350 of the PPU 300 of FIG. 3, in accordance with an embodiment. As shown in FIG. 4A, each GPC 350 includes a number of hardware units for processing tasks. In an embodiment, each GPC 350 includes a pipeline manager 410, a pre-raster operations unit (PROP) 415, a raster engine 425, a work distribution crossbar (WDX) 480, a memory management unit (MMU) 490, and one or more Data Processing Clusters (DPCs) 420. It will be appreciated that the GPC 350 of FIG. 4A may include other hardware units in lieu of or in addition to the units shown in FIG. 4A.

In an embodiment, the operation of the GPC 350 is controlled by the pipeline manager 410. The pipeline manager 410 manages the configuration of the one or more DPCs 420 for processing tasks allocated to the GPC 350. In an embodiment, the pipeline manager 410 may configure at least one of the one or more DPCs 420 to implement at least a portion of a graphics rendering pipeline. For example, a DPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the DPCs 420 for processing by the primitive engine 435 or the SM 440. In an embodiment, the pipeline manager 410 may configure at least one of the one or more DPCs 420 to implement a neural network model and/or a computing pipeline.

Figure 4B:
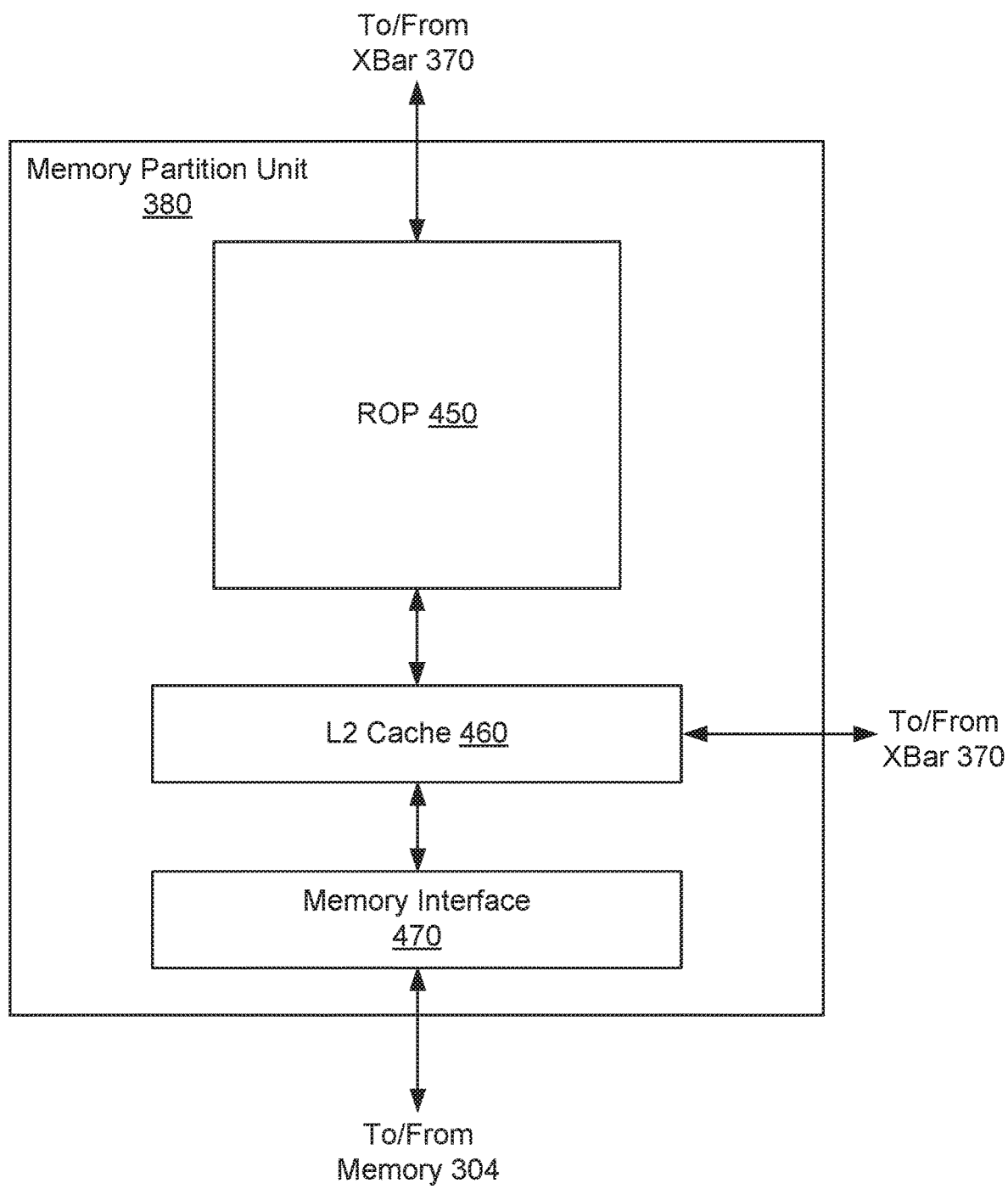
FIG. 4B illustrates a memory partition unit of the parallel processing unit of FIG. 3, in accordance with an embodiment.

The PROP unit 415 is configured to route data generated by the raster engine 425 and the DPCs 420 to a Raster Operations (ROP) unit, described in more detail in conjunction with FIG. 4B. The PROP unit 415 may also be configured to perform optimizations for color blending, organize pixel data, perform address translations, and the like.

The raster engine 425 includes a number of fixed function hardware units configured to perform various raster operations. In an embodiment, the raster engine 425 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 425 comprises fragments to be processed, for example, by a fragment shader implemented within a DPC 420.

Each DPC 420 included in the GPC 350 includes an M-Pipe Controller (MPC) 430, a primitive engine 435, and one or more SMs 440. The MPC 430 controls the operation of the DPC 420, routing packets received from the pipeline manager 410 to the appropriate units in the DPC 420. For example, packets associated with a vertex may be routed to the primitive engine 435, which is configured to fetch vertex attributes associated with the vertex from the memory 304. In contrast, packets associated with a shader program may be transmitted to the SM 440.

The SM 440 comprises a programmable streaming processor that is configured to process tasks represented by a number of threads. Each SM 440 is multi-threaded and configured to execute a plurality of threads (e.g., 32 threads) from a particular group of threads concurrently. In an embodiment, the SM 440 implements a SIMD (Single-Instruction, Multiple-Data) architecture where each thread in a group of threads (e.g., a warp) is configured to process a different set of data based on the same set of instructions. All threads in the group of threads execute the same instructions. In another embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 440 will be described in more detail below in conjunction with FIG. 5A.

The MMU 490 provides an interface between the GPC 350 and the memory partition unit 380. The MMU 490 may provide translation of virtual addresses into physical addresses, memory protection, and arbitration of memory requests. In an embodiment, the MMU 490 provides one or more translation lookaside buffers (TLBs) for performing translation of virtual addresses into physical addresses in the memory 304.

FIG. 4B illustrates a memory partition unit 380 of the PPU 300 of FIG. 3, in accordance with an embodiment. As shown in FIG. 4B, the memory partition unit 380 includes a Raster Operations (ROP) unit 450, a level two (L2) cache 460, and a memory interface 470. The memory interface 470 is coupled to the memory 304. Memory interface 470 may implement 32, 64, 128, 1024-bit data buses, or the like, for high-speed data transfer. In an embodiment, the PPU 300 incorporates U memory interfaces 470, one memory interface 470 per pair of memory partition units 380, where each pair of memory partition units 380 is connected to a corresponding memory device of the memory 304. For example, PPU 300 may be connected to up to Y memory devices, such as high bandwidth memory stacks or graphics double-data-rate, version 5, synchronous dynamic random access memory, or other types of persistent storage.

In an embodiment, the memory interface 470 implements an HBM2 memory interface and Y equals half U. In an embodiment, the HBM2 memory stacks are located on the same physical package as the PPU 300, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 304 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 300 process very large datasets and/or run applications for extended periods.

In an embodiment, the PPU 300 implements a multi-level memory hierarchy. In an embodiment, the memory partition unit 380 supports a unified memory to provide a single unified virtual address space for CPU and PPU 300 memory, enabling data sharing between virtual memory systems. In an embodiment the frequency of accesses by a PPU 300 to memory located on other processors is traced to ensure that memory pages are moved to the physical memory of the PPU 300 that is accessing the pages more frequently. In an embodiment, the NVLink 310 supports address translation services allowing the PPU 300 to directly access a CPU's page tables and providing full access to CPU memory by the PPU 300.

In an embodiment, copy engines transfer data between multiple PPUs 300 or between PPUs 300 and CPUs. The copy engines can generate page faults for addresses that are not mapped into the page tables. The memory partition unit 380 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 304 or other system memory may be fetched by the memory partition unit 380 and stored in the L2 cache 460, which is located on-chip and is shared between the various GPCs 350. As shown, each memory partition unit 380 includes a portion of the L2 cache 460 associated with a corresponding memory 304. Lower level caches may then be implemented in various units within the GPCs 350. For example, each of the SMs 440 may implement a level one (L1) cache. The L1 cache is private memory that is dedicated to a particular SM 440. Data from the L2 cache 460 may be fetched and stored in each of the L1 caches for processing in the functional units of the SMs 440. The L2 cache 460 is coupled to the memory interface 470 and the XBar 370.

The ROP unit 450 performs graphics raster operations related to pixel color, such as color compression, pixel blending, and the like. The ROP unit 450 also implements depth testing in conjunction with the raster engine 425, receiving a depth for a sample location associated with a pixel fragment from the culling engine of the raster engine 425. The depth is tested against a corresponding depth in a depth buffer for a sample location associated with the fragment. If the fragment passes the depth test for the sample location, then the ROP unit 450 updates the depth buffer and transmits a result of the depth test to the raster engine 425. It will be appreciated that the number of memory partition units 380 may be different than the number of GPCs 350 and, therefore, each ROP unit 450 may be coupled to each of the GPCs 350. The ROP unit 450 tracks packets received from the different GPCs 350 and determines which GPC 350 that a result generated by the ROP unit 450 is routed to through the Xbar 370. Although the ROP unit 450 is included within the memory partition unit 380 in FIG. 4B, in other embodiment, the ROP unit 450 may be outside of the memory partition unit 380. For example, the ROP unit 450 may reside in the GPC 350 or another unit.

Figure 5A:
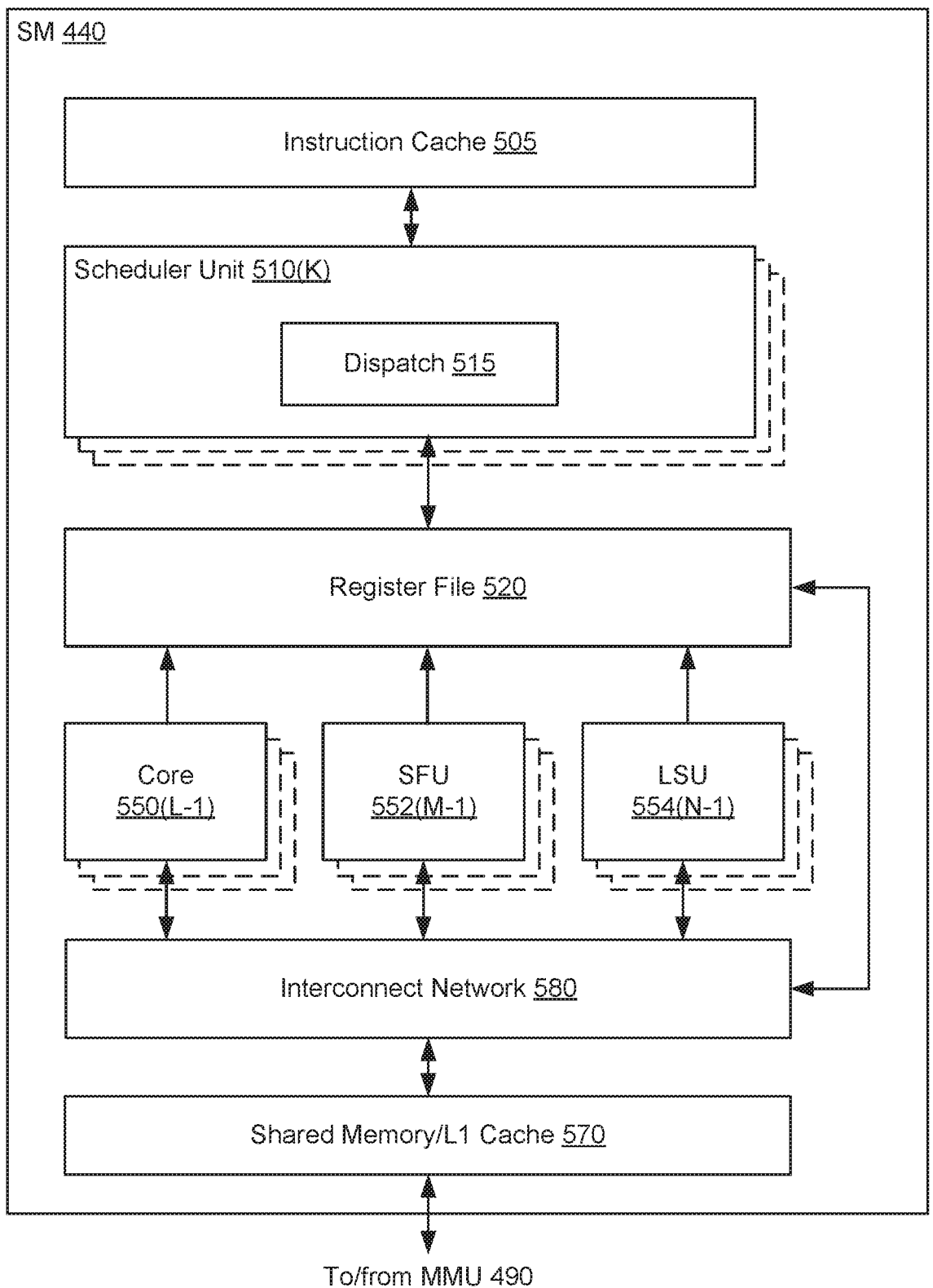
FIG. 5A illustrates the streaming multi-processor of FIG. 4A, in accordance with an embodiment.

FIG. 5A illustrates the streaming multi-processor 440 of FIG. 4A, in accordance with an embodiment. As shown in FIG. 5A, the SM 440 includes an instruction cache 505, one or more scheduler units 510, a register file 520, one or more processing cores 550, one or more special function units (SFUs) 552, one or more load/store units (LSUs) 554, an interconnect network 580, a shared memory/L1 cache 570.

As described above, the work distribution unit 325 dispatches tasks for execution on the GPCs 350 of the PPU 300. The tasks are allocated to a particular DPC 420 within a GPC 350 and, if the task is associated with a shader program, the task may be allocated to an SM 440. The scheduler unit 510 receives the tasks from the work distribution unit 325 and manages instruction scheduling for one or more thread blocks assigned to the SM 440. The scheduler unit 510 schedules thread blocks for execution as warps of parallel threads, where each thread block is allocated at least one warp. In an embodiment, each warp executes 32 threads. The scheduler unit 510 may manage a plurality of different thread blocks, allocating the warps to the different thread blocks and then dispatching instructions from the plurality of different cooperative groups to the various functional units (e.g., cores 550, SFUs 552, and LSUs 554) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 515 is configured to transmit instructions to one or more of the functional units. In the embodiment, the scheduler unit 510 includes two dispatch units 515 that enable two different instructions from the same warp to be dispatched during each clock cycle. In alternative embodiments, each scheduler unit 510 may include a single dispatch unit 515 or additional dispatch units 515.

Each SM 440 includes a register file 520 that provides a set of registers for the functional units of the SM 440. In an embodiment, the register file 520 is divided between each of the functional units such that each functional unit is allocated a dedicated portion of the register file 520. In another embodiment, the register file 520 is divided between the different warps being executed by the SM 440. The register file 520 provides temporary storage for operands connected to the data paths of the functional units.

Each SM 440 comprises L processing cores 550. In an embodiment, the SM 440 includes a large number (e.g., 128, etc.) of distinct processing cores 550. Each core 550 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 550 include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the cores 550. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 440 also comprises M SFUs 552 that perform special functions (e.g., attribute evaluation, reciprocal square root, and the like). In an embodiment, the SFUs 552 may include a tree traversal unit configured to traverse a hierarchical tree data structure. In an embodiment, the SFUs 552 may include texture unit configured to perform texture map filtering operations. In an embodiment, the texture units are configured to load texture maps (e.g., a 2D array of texels) from the memory 304 and sample the texture maps to produce sampled texture values for use in shader programs executed by the SM 440. In an embodiment, the texture maps are stored in the shared memory/L1 cache 470. The texture units implement texture operations such as filtering operations using mip-maps (e.g., texture maps of varying levels of detail). In an embodiment, each SM 340 includes two texture units.

Each SM 440 also comprises N LSUs 554 that implement load and store operations between the shared memory/L1 cache 570 and the register file 520. Each SM 440 includes an interconnect network 580 that connects each of the functional units to the register file 520 and the LSU 554 to the register file 520, shared memory/L1 cache 570. In an embodiment, the interconnect network 580 is a crossbar that can be configured to connect any of the functional units to any of the registers in the register file 520 and connect the LSUs 554 to the register file and memory locations in shared memory/L1 cache 570.

The shared memory/L1 cache 570 is an array of on-chip memory that allows for data storage and communication between the SM 440 and the primitive engine 435 and between threads in the SM 440. In an embodiment, the shared memory/L1 cache 570 comprises 128 KB of storage capacity and is in the path from the SM 440 to the memory partition unit 380. The shared memory/L1 cache 570 can be used to cache reads and writes. One or more of the shared memory/L1 cache 570, L2 cache 460, and memory 304 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 570 enables the shared memory/L1 cache 570 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 3, are bypassed, creating a much simpler programming model. In the general purpose parallel computation configuration, the work distribution unit 325 assigns and distributes blocks of threads directly to the DPCs 420. The threads in a block execute the same program, using a unique thread ID in the calculation to ensure each thread generates unique results, using the SM 440 to execute the program and perform calculations, shared memory/L1 cache 570 to communicate between threads, and the LSU 554 to read and write global memory through the shared memory/L1 cache 570 and the memory partition unit 380. When configured for general purpose parallel computation, the SM 440 can also write commands that the scheduler unit 320 can use to launch new work on the DPCs 420.

The PPU 300 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 300 is embodied on a single semiconductor substrate. In another embodiment, the PPU 300 is included in a system-on-a-chip (SoC) along with one or more other devices such as additional PPUs 300, the memory 304, a reduced instruction set computer (RISC) CPU, a memory management unit (MMU), a digital-to-analog converter (DAC), and the like.

In an embodiment, the PPU 300 may be included on a graphics card that includes one or more memory devices. The graphics card may be configured to interface with a PCIe slot on a motherboard of a desktop computer. In yet another embodiment, the PPU 300 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5B:
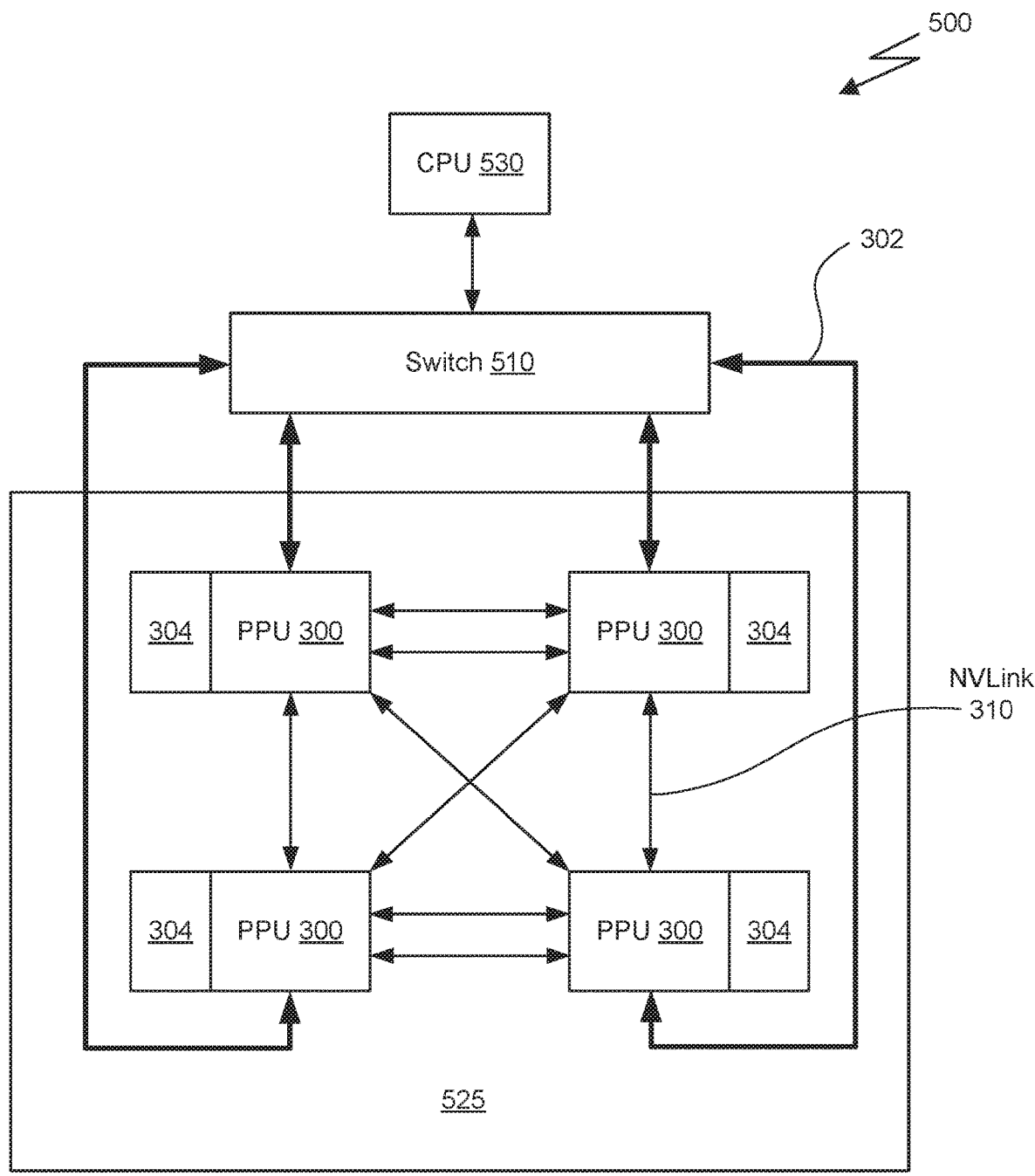
FIG. 5B is a conceptual diagram of a processing system implemented using the PPU of FIG. 3, in accordance with an embodiment.

FIG. 5B is a conceptual diagram of a processing system 500 implemented using the PPU 300 of FIG. 3, in accordance with an embodiment. The processing system 500 includes a CPU 530, switch 510, and multiple PPUs 300, and respective memories 304. The NVLink 310 provides high-speed communication links between each of the PPUs 300. Although a particular number of NVLink 310 and interconnect 302 connections are illustrated in FIG. 5B, the number of connections to each PPU 300 and the CPU 530 may vary. The switch 510 interfaces between the interconnect 302 and the CPU 530. The PPUs 300, memories 304, and NVLinks 310 may be situated on a single semiconductor platform to form a parallel processing module 525. In an embodiment, the switch 510 supports two or more protocols to interface between various different connections and/or links.

In another embodiment (not shown), the NVLink 310 provides one or more high-speed communication links between each of the PPUs 300 and the CPU 530 and the switch 510 interfaces between the interconnect 302 and each of the PPUs 300. The PPUs 300, memories 304, and interconnect 302 may be situated on a single semiconductor platform to form a parallel processing module 525. In yet another embodiment (not shown), the interconnect 302 provides one or more communication links between each of the PPUs 300 and the CPU 530 and the switch 510 interfaces between each of the PPUs 300 using the NVLink 310 to provide one or more high-speed communication links between the PPUs 300. In another embodiment (not shown), the NVLink 310 provides one or more high-speed communication links between the PPUs 300 and the CPU 530 through the switch 510. In yet another embodiment (not shown), the interconnect 302 provides one or more communication links between each of the PPUs 300 directly. One or more of the NVLink 310 high-speed communication links may be implemented as a physical NVLink interconnect or either an on-chip or on-die interconnect using the same protocol as the NVLink 310.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 300 and/or memories 304 may be packaged devices. In an embodiment, the CPU 530, switch 510, and the parallel processing module 525 are situated on a single semiconductor platform.

In an embodiment, the signaling rate of each NVLink 310 is 20 to 25 Gigabits/second and each PPU 300 includes six NVLink 310 interfaces (as shown in FIG. 5B, five NVLink 310 interfaces are included for each PPU 300). Each NVLink 310 provides a data transfer rate of 25 Gigabytes/second in each direction, with six links providing 300 Gigabytes/second. The NVLinks 310 can be used exclusively for PPU-to-PPU communication as shown in FIG. 5B, or some combination of PPU-to-PPU and PPU-to-CPU, when the CPU 530 also includes one or more NVLink 310 interfaces.

In an embodiment, the NVLink 310 allows direct load/store/atomic access from the CPU 530 to each PPU's 300 memory 304. In an embodiment, the NVLink 310 supports coherency operations, allowing data read from the memories 304 to be stored in the cache hierarchy of the CPU 530, reducing cache access latency for the CPU 530. In an embodiment, the NVLink 310 includes support for Address Translation Services (ATS), allowing the PPU 300 to directly access page tables within the CPU 530. One or more of the NVLinks 310 may also be configured to operate in a low-power mode.

Figure 5C:
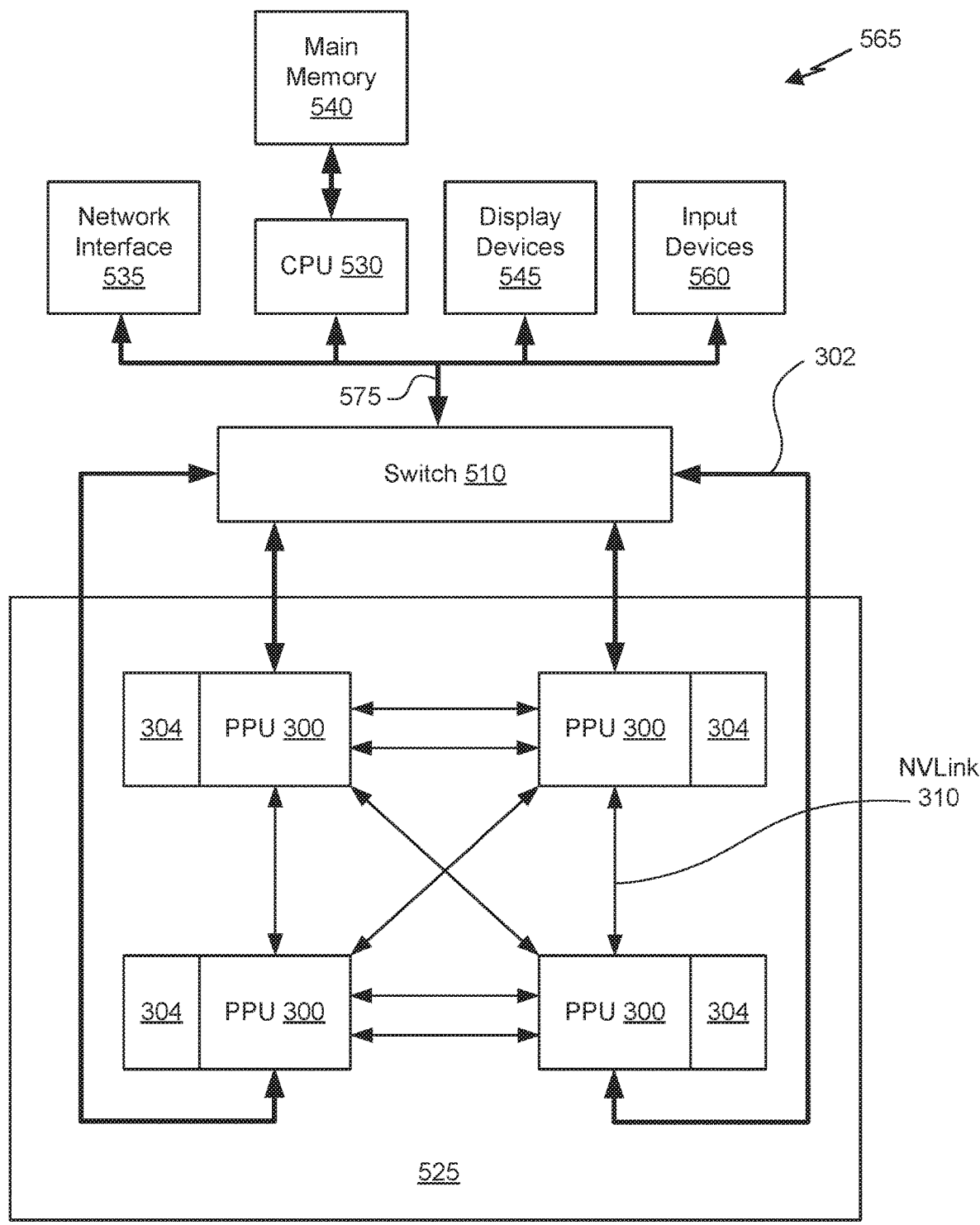
FIG. 5C illustrates an exemplary system in which the various architecture and/or functionality of the various previous embodiments may be implemented.

FIG. 5C illustrates an exemplary system 565 in which the various architecture and/or functionality of the various previous embodiments may be implemented. As shown, a system 565 is provided including at least one central processing unit 530 that is connected to a communication bus 575. The communication bus 575 may be implemented using any suitable protocol, such as PCI (Peripheral Component Interconnect), PCI-Express, AGP (Accelerated Graphics Port), HyperTransport, or any other bus or point-to-point communication protocol(s). The system 565 also includes a main memory 540. Control logic (software) and data are stored in the main memory 540 which may take the form of random access memory (RAM).

The system 565 also includes input devices 560, the parallel processing system 525, and display devices 545, e.g. a conventional CRT (cathode ray tube), LCD (liquid crystal display), LED (light emitting diode), plasma display or the like. User input may be received from the input devices 560, e.g., keyboard, mouse, touchpad, microphone, and the like. Each of the foregoing modules and/or devices may even be situated on a single semiconductor platform to form the system 565. Alternately, the various modules may also be situated separately or in various combinations of semiconductor platforms per the desires of the user.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes.

The system 565 may also include a secondary storage (not shown). The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 540 and/or the secondary storage. Such computer programs, when executed, enable the system 565 to perform various functions. The memory 540, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 565 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Graphics Processing Pipeline

In an embodiment, the PPU 300 comprises a graphics processing unit (GPU). The PPU 300 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 300 can be configured to process the graphics primitives to generate a frame buffer (e.g., pixel data for each of the pixels of the display).

An application writes model data for a scene (e.g., a collection of vertices and attributes) to a memory such as a system memory or memory 304. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 440 of the PPU 300 including one or more of a vertex shader, hull shader, domain shader, geometry shader, and a pixel shader. For example, one or more of the SMs 440 may be configured to execute a vertex shader program that processes a number of vertices defined by the model data. In an embodiment, the different SMs 440 may be configured to execute different shader programs concurrently. For example, a first subset of SMs 440 may be configured to execute a vertex shader program while a second subset of SMs 440 may be configured to execute a pixel shader program. The first subset of SMs 440 processes vertex data to produce processed vertex data and writes the processed vertex data to the L2 cache 460 and/or the memory 304. After the processed vertex data is rasterized (e.g., transformed from three-dimensional data into two-dimensional data in screen space) to produce fragment data, the second subset of SMs 440 executes a pixel shader to produce processed fragment data, which is then blended with other processed fragment data and written to the frame buffer in memory 304. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

Figure 6:
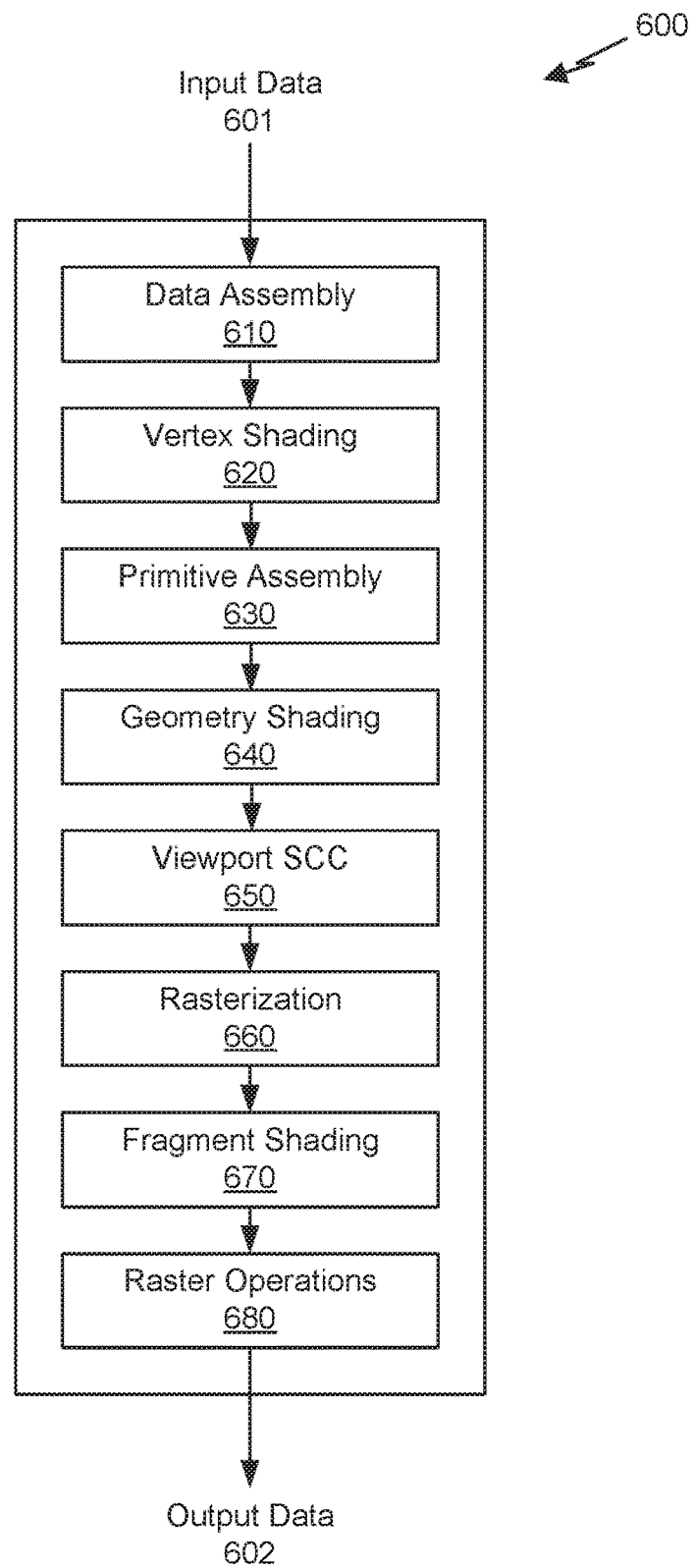
FIG. 6 is a conceptual diagram of a graphics processing pipeline implemented by the PPU of FIG. 3, in accordance with an embodiment.

FIG. 6 is a conceptual diagram of a graphics processing pipeline 600 implemented by the PPU 300 of FIG. 3, in accordance with an embodiment. The graphics processing pipeline 600 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 600 receives input data 601 that is transmitted from one stage to the next stage of the graphics processing pipeline 600 to generate output data 602. In an embodiment, the graphics processing pipeline 600 may represent a graphics processing pipeline defined by the OpenGL® API. As an option, the graphics processing pipeline 600 may be implemented in the context of the functionality and architecture of the previous Figures and/or any subsequent Figure(s).

As shown in FIG. 6, the graphics processing pipeline 600 comprises a pipeline architecture that includes a number of stages. The stages include, but are not limited to, a data assembly stage 610, a vertex shading stage 620, a primitive assembly stage 630, a geometry shading stage 640, a viewport scale, cull, and clip (VSCC) stage 650, a rasterization stage 660, a fragment shading stage 670, and a raster operations stage 680. In an embodiment, the input data 601 comprises commands that configure the processing units to implement the stages of the graphics processing pipeline 600 and geometric primitives (e.g., points, lines, triangles, quads, triangle strips or fans, etc.) to be processed by the stages. The output data 602 may comprise pixel data (e.g., color data) that is copied into a frame buffer or other type of surface data structure in a memory.

The data assembly stage 610 receives the input data 601 that specifies vertex data for high-order surfaces, primitives, or the like. The data assembly stage 610 collects the vertex data in a temporary storage or queue, such as by receiving a command from the host processor that includes a pointer to a buffer in memory and reading the vertex data from the buffer. The vertex data is then transmitted to the vertex shading stage 620 for processing.

The vertex shading stage 620 processes vertex data by performing a set of operations (e.g., a vertex shader or a program) once for each of the vertices. Vertices may be, e.g., specified as a 4-coordinate vector (e.g., <x, y, z, w>) associated with one or more vertex attributes (e.g., color, texture coordinates, surface normal, etc.). The vertex shading stage 620 may manipulate individual vertex attributes such as position, color, texture coordinates, and the like. In other words, the vertex shading stage 620 performs operations on the vertex coordinates or other vertex attributes associated with a vertex. Such operations commonly including lighting operations (e.g., modifying color attributes for a vertex) and transformation operations (e.g., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 620 generates transformed vertex data that is transmitted to the primitive assembly stage 630.

The primitive assembly stage 630 collects vertices output by the vertex shading stage 620 and groups the vertices into geometric primitives for processing by the geometry shading stage 640. For example, the primitive assembly stage 630 may be configured to group every three consecutive vertices as a geometric primitive (e.g., a triangle) for transmission to the geometry shading stage 640. In some embodiments, specific vertices may be reused for consecutive geometric primitives (e.g., two consecutive triangles in a triangle strip may share two vertices). The primitive assembly stage 630 transmits geometric primitives (e.g., a collection of associated vertices) to the geometry shading stage 640.

The geometry shading stage 640 processes geometric primitives by performing a set of operations (e.g., a geometry shader or program) on the geometric primitives. Tessellation operations may generate one or more geometric primitives from each geometric primitive. In other words, the geometry shading stage 640 may subdivide each geometric primitive into a finer mesh of two or more geometric primitives for processing by the rest of the graphics processing pipeline 600. The geometry shading stage 640 transmits geometric primitives to the viewport SCC stage 650.

In an embodiment, the graphics processing pipeline 600 may operate within a streaming multiprocessor and the vertex shading stage 620, the primitive assembly stage 630, the geometry shading stage 640, the fragment shading stage 670, and/or hardware/software associated therewith, may sequentially perform processing operations. Once the sequential processing operations are complete, in an embodiment, the viewport SCC stage 650 may utilize the data. In an embodiment, primitive data processed by one or more of the stages in the graphics processing pipeline 600 may be written to a cache (e.g. L1 cache, a vertex cache, etc.). In this case, in an embodiment, the viewport SCC stage 650 may access the data in the cache. In an embodiment, the viewport SCC stage 650 and the rasterization stage 660 are implemented as fixed function circuitry.

The viewport SCC stage 650 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (e.g., discarded) because the geometric primitive will not contribute to the final rendered scene. Any geometric primitive that is partially inside the viewing frustum and partially outside the viewing frustum may be clipped (e.g., transformed into a new geometric primitive that is enclosed within the viewing frustum. Furthermore, geometric primitives may each be scaled based on a depth of the viewing frustum. All potentially visible geometric primitives are then transmitted to the rasterization stage 660.

The rasterization stage 660 converts the 3D geometric primitives into 2D fragments (e.g. capable of being utilized for display, etc.). The rasterization stage 660 may be configured to utilize the vertices of the geometric primitives to setup a set of plane equations from which various attributes can be interpolated. The rasterization stage 660 may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization stage 660 generates fragment data (e.g., interpolated vertex attributes associated with a particular sample location for each covered pixel) that are transmitted to the fragment shading stage 670.

The fragment shading stage 670 processes fragment data by performing a set of operations (e.g., a fragment shader or a program) on each of the fragments. The fragment shading stage 670 may generate pixel data (e.g., color values) for the fragment such as by performing lighting operations or sampling texture maps using interpolated texture coordinates for the fragment. The fragment shading stage 670 generates pixel data that is transmitted to the raster operations stage 680.

The raster operations stage 680 may perform various operations on the pixel data such as performing alpha tests, stencil tests, and blending the pixel data with other pixel data corresponding to other fragments associated with the pixel. When the raster operations stage 680 has finished processing the pixel data (e.g., the output data 602), the pixel data may be written to a render target such as a frame buffer, a color buffer, or the like.

It will be appreciated that one or more additional stages may be included in the graphics processing pipeline 600 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 640). Other types of graphics processing pipelines are contemplated as being within the scope of the present disclosure. Furthermore, any of the stages of the graphics processing pipeline 600 may be implemented by one or more dedicated hardware units within a graphics processor such as PPU 300. Other stages of the graphics processing pipeline 600 may be implemented by programmable hardware units such as the SM 440 of the PPU 300.

The graphics processing pipeline 600 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the PPU 300. The API provides an abstraction for a programmer that lets a programmer utilize specialized graphics hardware, such as the PPU 300, to generate the graphical data without requiring the programmer to utilize the specific instruction set for the PPU 300. The application may include an API call that is routed to the device driver for the PPU 300. The device driver interprets the API call and performs various operations to respond to the API call. In some instances, the device driver may perform operations by executing instructions on the CPU. In other instances, the device driver may perform operations, at least in part, by launching operations on the PPU 300 utilizing an input/output interface between the CPU and the PPU 300. In an embodiment, the device driver is configured to implement the graphics processing pipeline 600 utilizing the hardware of the PPU 300.

Various programs may be executed within the PPU 300 in order to implement the various stages of the graphics processing pipeline 600. For example, the device driver may launch a kernel on the PPU 300 to perform the vertex shading stage 620 on one SM 440 (or multiple SMs 440). The device driver (or the initial kernel executed by the PPU 400) may also launch other kernels on the PPU 400 to perform other stages of the graphics processing pipeline 600, such as the geometry shading stage 640 and the fragment shading stage 670. In addition, some of the stages of the graphics processing pipeline 600 may be implemented on fixed unit hardware such as a rasterizer or a data assembler implemented within the PPU 400. It will be appreciated that results from one kernel may be processed by one or more intervening fixed function hardware units before being processed by a subsequent kernel on an SM 440.

Algorithm for Generating Sample Points

The algorithm for generating sample points relies on one or more data structures that indicate which ranges within a selected elementary interval are valid or invalid for new sample points. This enables a random or pseudo-random selection of candidate locations by selecting those locations with a priori knowledge that the selected location is valid.

Figure 7:
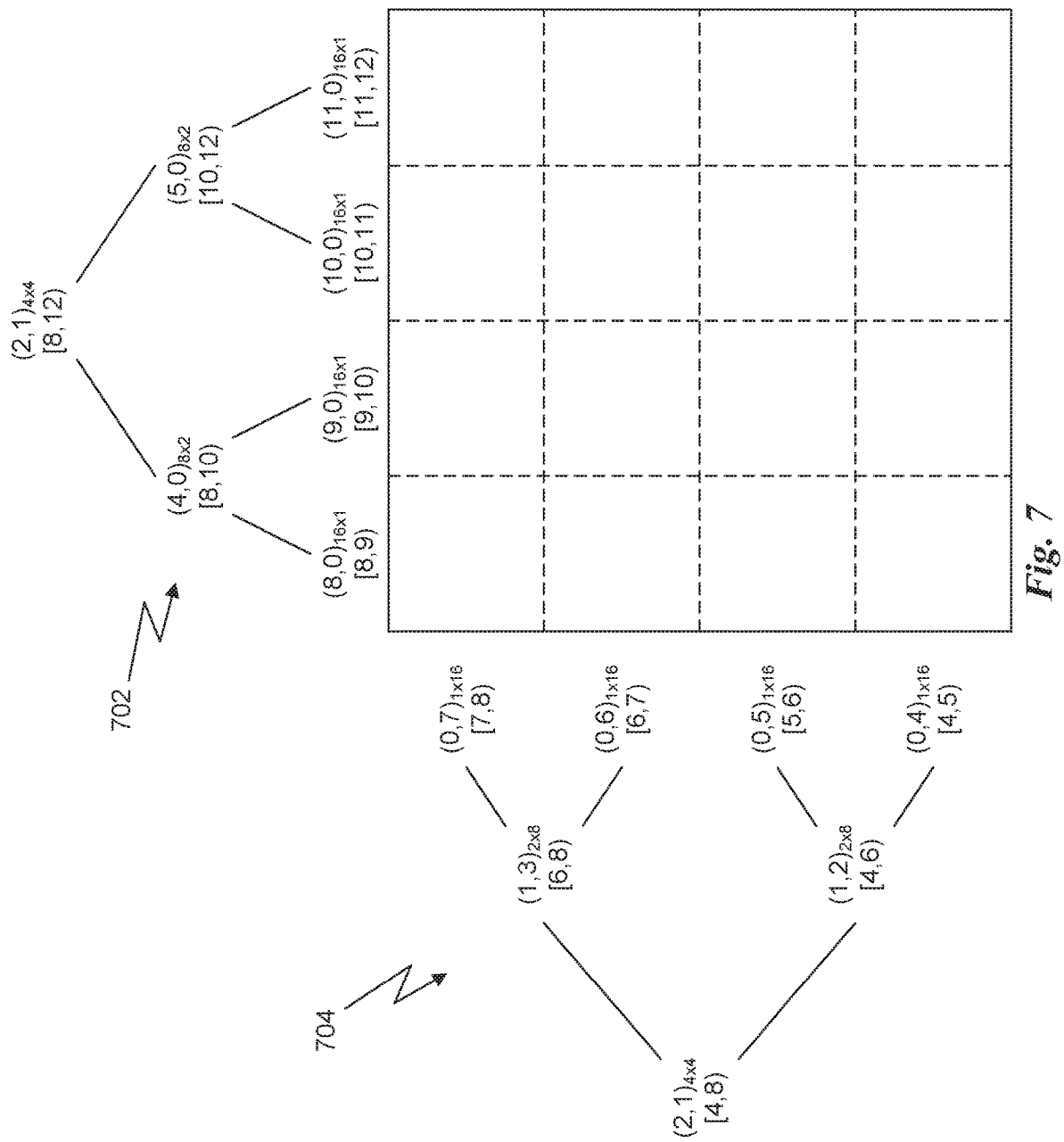
FIG. 7 illustrates a pair of binary trees constructed to identify invalid regions within a given elementary interval e, in accordance with some embodiments.

FIG. 7 illustrates a pair of binary trees constructed to identify invalid regions within a given elementary interval e, in accordance with some embodiments. The particular elementary interval depicted is $e=(2,1)_{4\times4}$. Each non-root node of the binary tree corresponds with a range within the extents of the elementary interval e in a particular dimension and stores a Boolean value that is true if that range is completely covered by already-occupied overlapping elementary intervals. A first binary tree 702 corresponds to the x dimension and includes $n/n_x$ leaves that encode, respectively, whether the corresponding range within elementary interval e is valid or invalid, and a second binary tree 704 corresponds to the y dimension and includes $n/n_y$ leaves that encode, respectively, whether the corresponding range within elementary interval e is valid or invalid. Interior nodes store a Boolean value that is true only if the entire range that the node's children cover are invalid. In an embodiment, the binary trees can be represented as bit vectors.

Pseudocode for initializing a binary tree for the x dimension is given below in Table 1:

TABLE 1 function InitializeXTree (node, x, y, $n_x$, $n_y$)
  if [(x, y)$_{n_x \times n_y}$ is filled with sample] then
    node.occupied ← true
  else
    node.occupied ← false
    if !(node.leaf) then
      InitializeXTree (node.left, 2x, y/2, $2n_x$, $n_y/2$)
      InitializeXTree (node.right, 2x+1, y/2, $2n_x$, $n_y/2$)

Pseudocode for initializing a binary tree for the y dimension is given below in Table 2:

TABLE 2 function InitializeYTree (node, x, y, $n_x$, $n_y$)
  if [(x, y)$_{n_x \times n_y}$ is filled with sample] then
    node.occupied ← true TABLE 2-continued

```
    else
        node.occupied ← false
        if !(node.leaf) then
            InitializeYTree (node.left, x/2, 2y, n_x/2, 2n_y)
            InitializeYTree (node.right, x/2, 2y+1, n_x/2, 2n_y)
```

It will be appreciated that, when considering the set of overlapping elementary intervals in alternate stratifications, each non-root node in the pair of binary trees corresponds to exactly one overlapping elementary interval. For each occupied elementary interval, a corresponding node in the binary tree can be marked as occupied and no children of that node need be considered because the entire range covered by that occupied elementary interval is marked as invalid, which spans children, grandchildren, etc. of that node.

Once the binary trees are initialized for the selected elementary interval, the trees can be traversed to extract valid ranges within the extents of the elementary interval for a particular dimension. The valid ranges can be indicated via a list of indices with respect to the n×1 stratification in the x dimension and the 1×n stratification in the y dimension for unoccupied elementary intervals in those two stratifications, respectively.

Pseudocode for identifying the valid range within the extents of the elementary interval for the x dimension is given below in Table 3:

TABLE 3

```
function GetValidXOffsets (node, x, y, n_x, n_y, out offsets[ ])
    if !(node.occupied) then
        if node.isleaf then
            offsets.append(x)
        else
            GetValidXOffsets (node.left, 2x, [y/2], 2n_x, n_y/2, offsets)
            GetValidXOffsets (node.right, 2x+1, [y/2], 2n_x, n_y/2, offsets)
```

Pseudocode for identifying the valid range within the extents of the elementary interval for the y dimension is given below in Table 4:

TABLE 4

```
function GetValidYOffsets (node, x, y, n_x, n_y, out offsets[ ])
    if !(node.occupied) then
        if node.isleaf then
            offsets.append(y)
        else
            GetValidYOffsets (node.left, 2x, [y/2], 2n_x, n_y/2, offsets)
            GetValidYOffsets (node.right, 2x+1, [y/2], 2n_x, n_y/2, offsets)
```

Given the arrays of valid offsets, generating a valid sample within the elementary interval is a matter of randomly selecting an element from each array, elements x' and y', and randomly or pseudo-randomly selecting a sample that falls within the corresponding x' and y' ranges given as:

$$\left[\frac{x'}{n}, \frac{x'+1}{n}\right) \times \left[\frac{y'}{n}, \frac{y'+1}{n}\right) \quad \text{(Eq. 1)}$$

Figure 8:
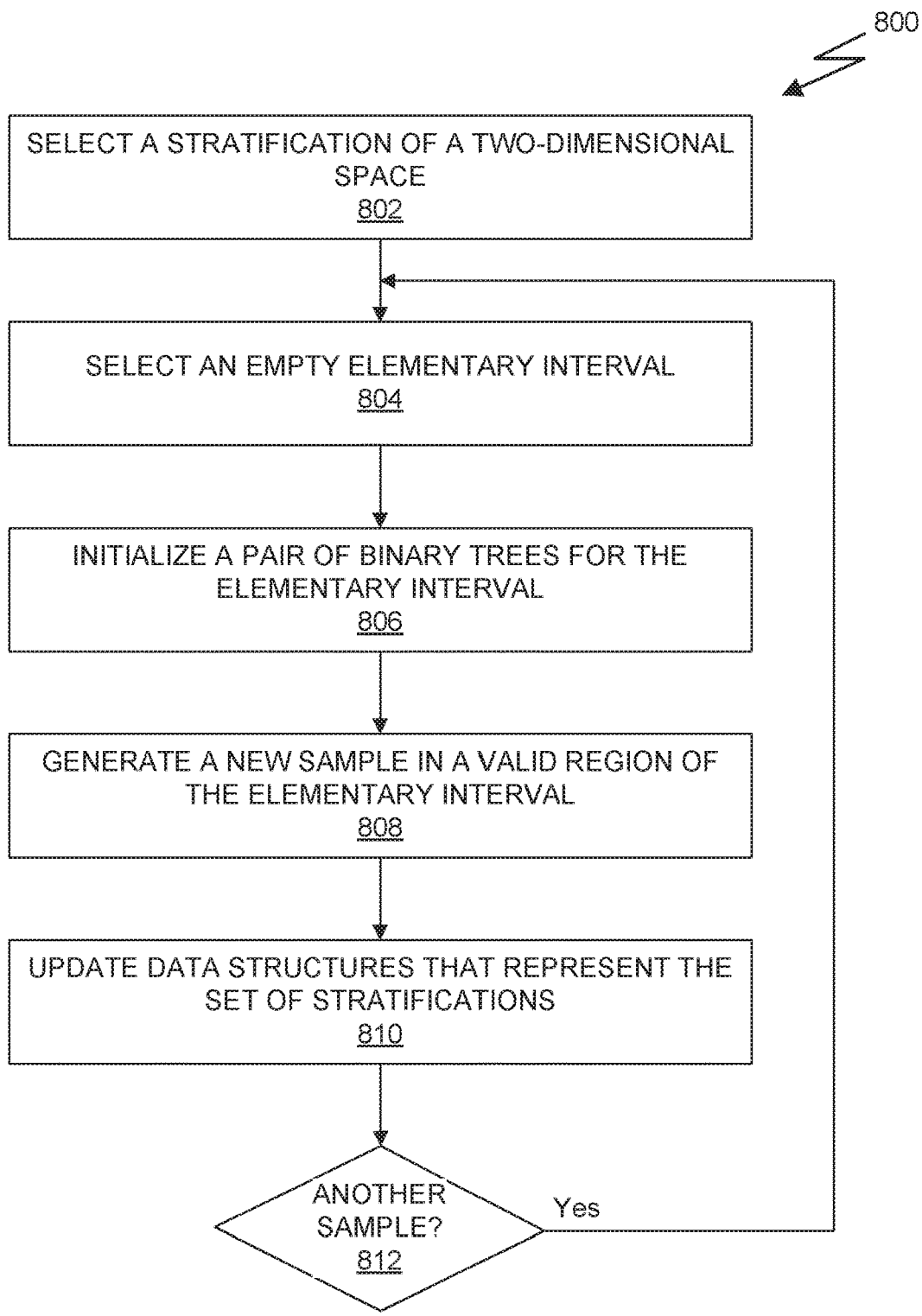
FIG. 8 is a flow chart of a method that depicts the steps of an algorithm for generating a set of well-distributed samples in a two-dimensional space, in accordance with some embodiments.

FIG. 8 is a flow chart of a method 800 that depicts the steps of an algorithm for generating a set of well-distributed samples in a two-dimensional space, in accordance with some embodiments. The steps set forth below are described with the understanding that the steps are implemented as computer program instructions executed by a processor such as processor 102 of FIG. 1. However, one of skill in the art will recognize that the method 800 can be performed by software, hardware, or a combination of software and hardware, in various embodiments. Any system that performs the steps of method 800 is contemplated as being within the scope of the following disclosure.

At step 802, a stratification of a two-dimensional space is selected. In an embodiment, one of the stratifications in the set of all possible stratifications of the 2D space is selected in order to generate a set of sample points. In an exemplary embodiments, the stratification is selected to minimize the difference between $n_x$ and $n_y$. Selection of the stratification according to this criteria will balance the binary trees in the x dimension and the y dimension, which, as the number of generated samples increases, can improve the efficiency of the algorithm by minimizing tree traversal steps by limiting the maximum depth of the trees.

In some embodiments, a data structure can be created for each stratification in the set of all possible stratifications. The data structure can be a bitmap where each elementary interval in the stratification corresponds to one of the bits. The bitmaps are, therefore, of dimensions $n_x \times n_y$ (e.g., n×1, n/2×2, n/4×4, ..., 2×n/2, and 1×n, where $n=n_x n_y$). This set of bitmaps can be updated after each sample is generated to indicate which elementary intervals in the stratification are occupied by the sample. In an embodiment, at initialization, the bitmaps can be initialized to all 0s, where a 1 indicates the elementary interval corresponding to the bit is occupied by a sample in the set of samples.

At step 804, an empty elementary interval in the selected stratification is selected. In an embodiment, the selected stratification can be traversed in scanline order. For example, an index i and an index j can be initialized to zero and a nested loop can be implemented where the outer loop increments i from 0 to $n_y$ and the inner loop increments j from 0 to $n_x$. The inner loop selects elementary interval $e=(i,j)_{n_x \times n_y}$ as the next empty elementary interval.

In other embodiments, the elementary interval may be chosen such that the set of samples is progressive. For example, the two-dimensional space can be divided into quadrants and one elementary interval can be chosen in each quadrant. Then, each quadrant is divided into four sub-quadrants and three additional samples are chosen in the different sub-quadrants, and so on and so forth such that the subsets of the sample set are well-distributed as long as the subset is selected to include the first power-of-four number of samples from the sample set.

At step 806, a pair of binary trees is initialized for the selected elementary interval. In an embodiment, a first binary tree corresponding to the x dimension and a second binary tree corresponding to the y dimension are initialized.

At step 808, a new sample is generated in a valid region of the elementary interval. In some embodiments, the binary trees are traversed to generate arrays of valid offsets. One element of each array is then selected at random to identify a sub-region within the elementary interval that is both valid with respect to all other overlapping elementary intervals for other stratifications and inside the selected elementary interval of this particular stratification. A sample is then generated at random within the sub-region.

At step 810, data structures that represent the set of stratifications are updated to indicate which elementary interval in each stratification is occupied by the sample. In some embodiments, one bit in each bitmap corresponding to a stratification is set to indicate the corresponding elementary interval for that bit is occupied. It will be appreciated that the bit that is set is given by bitmap $$\left[\frac{x'}{n_y}\right]\left[\frac{y'}{n_x}\right],$$

where x' and y' are the indices selected for the sample during step 808 and $n_x$ and $n_y$ are dependent on the stratification corresponding to the bitmap.

At step 812, the processor determines whether another sample is to be generated. If another sample is to be generated, then the method 800 returns to step 804 and the next elementary interval is selected. Otherwise, the method 800 terminates.

Figure 9:
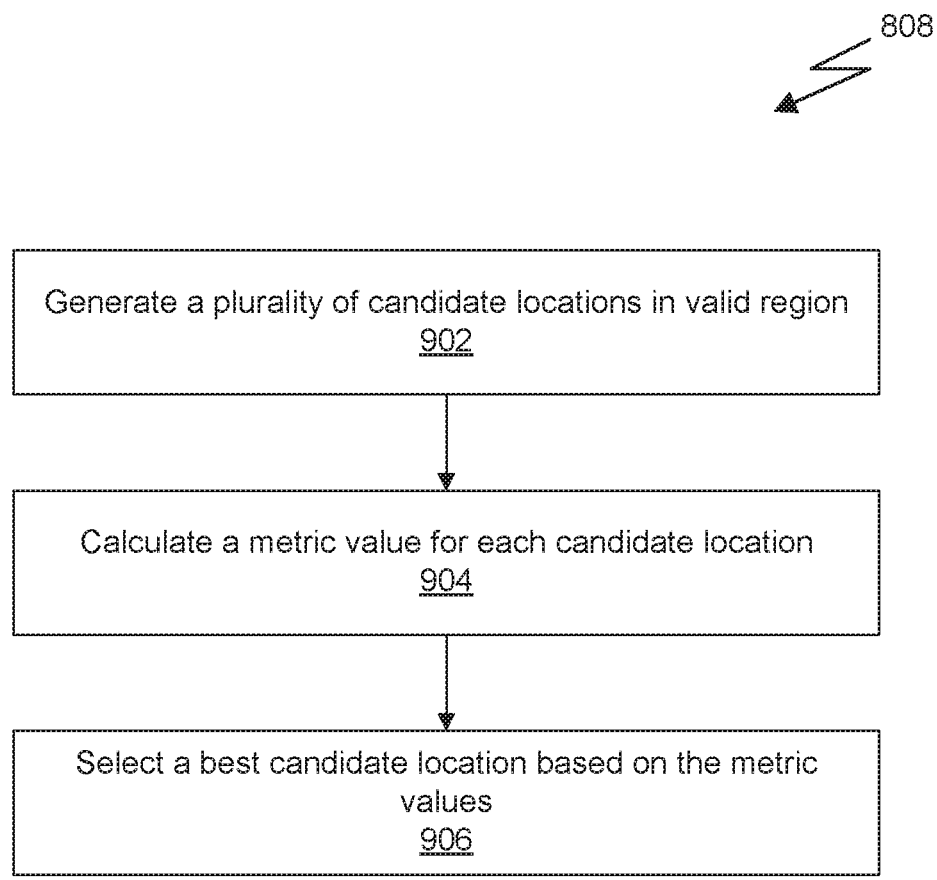
FIG. 9 illustrates a technique for adding blue noise to the distribution of samples, in accordance with some embodiments.

FIG. 9 illustrates a technique for adding blue noise to the distribution of samples, in accordance with some embodiments. The technique can be implemented by modifying step 808 of method 800. The step 808 proceeds as described above and one element from each of the arrays is selected to identify a valid region within the elementary interval.

At step 902, a plurality of candidate locations are generated in the valid region. For example, 10 or 32 candidate locations are generated randomly within the range of the elementary interval identified as valid.

At step 904, a metric value is calculated for each candidate location. In an embodiment, the metric value comprises a minimum distance between the candidate location and all other samples previously generated in the set of samples.

At step 906, a best candidate location is selected based on the metric values for all candidate location as the location for the sample. In an embodiment, the candidate location with the maximum metric value is selected as the best candidate location. In this case, the maximum value indicates the maximum distance of the candidate location from the nearest sample in the set of samples. All other candidate locations can be discarded and the best candidate location is used as the location for the new sample that is added to the set of samples.

This technique for adding blue noise to the sample distribution ensures that candidates are not too closely clumped together as samples become densely populated within the 2D space. It will also be appreciated that, even though method 800 is largely sequential, the steps 902 and 904 are suited to parallelism where candidate locations and a metric value for each candidate location can be computed in parallel and then the best candidate location can be selected using various sorting algorithms.

Figure 10:
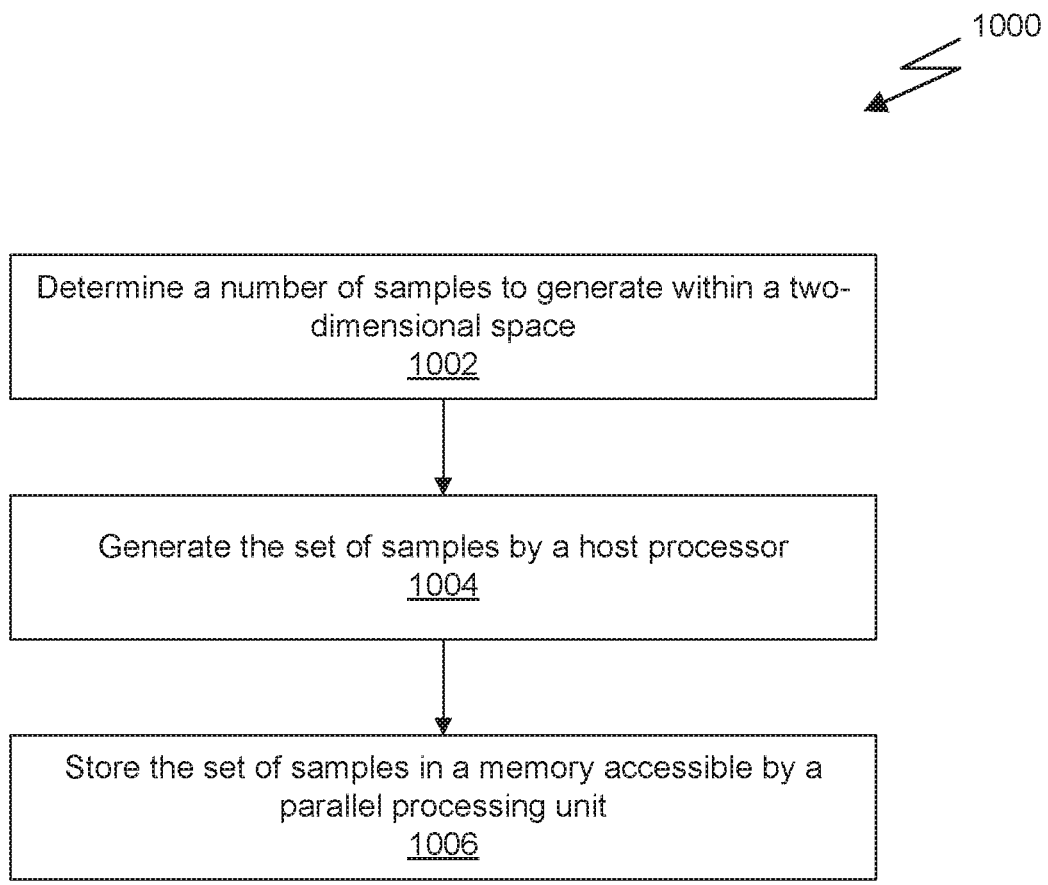
FIG. 10 is a flow chart of a method for generating and using a set of well-distributed samples, in accordance with some embodiments.

FIG. 10 is a flow chart of a method 1000 for generating and using a set of well-distributed samples, in accordance with some embodiments. The steps set forth below are described with the understanding that the steps are implemented as computer program instructions executed by a processor such as processor 102 of FIG. 1. However, one of skill in the art will recognize that the method 1000 can be performed by software, hardware, or a combination of software and hardware, in various embodiments. Any system that performs the steps of method 1000 is contemplated as being within the scope of the following disclosure At step 1002, a number of samples to generate within a two-dimensional space are determined, in accordance with some embodiments. In an embodiments, a fixed number of samples that provides a sufficient number of discrete data points for a particular application is set manually or automatically based on some criteria. For example, experiments can be established to determine a minimum number of samples that provides sufficient quality in the output of a rendering algorithm. In other embodiments, the number of samples can be determined dynamically based on a criteria or variables within a rendering algorithm. For example, a desired rendering quality can depend on a number of factors including motion of a virtual camera, motion of an object, location of the object within a scene, and the like. Motion blur in the final output can render increased accuracy in an intermediate representation of a rendered object largely moot due to post-processing to add the blur effect. Consequently, a number of samples selected when rendering the intermediate representation can be reduced to speed up rendering at the expense of decreased quality in the intermediate representation. In contrast, when the camera and the object are still or when the object is featured prominently within the scene such that the representation of the object occupies a large number of pixels in the foreground of the rendered image, then the algorithm may attempt to increase the number of samples utilized to increase the quality of the intermediate representation because the blur effect is reduced or eliminated and will no longer obscure any image artifacts caused by a low sample count.

At step 1004, the set of samples is generated by a host processor. In an embodiment, a host processor is a CPU and the set of samples is generated in a memory such as a system memory. The set of samples can be generated utilizing the method 800 set forth above.

At step 1006, the set of samples is stored in a memory accessible by a parallel processing unit. In an embodiment, the set of samples can be copied from the system memory to a graphics memory such as memory 304 of the PPU 300. The data structure including the samples can then be accessed by instructions executed on the PPU 300. For example, a graphics pipeline 600 can include instructions that select jittered positions for sample locations by querying the data structure during execution of the fragment shader 670. As another example, the PPU 300 can implement a program that performs transport and lighting simulation for a ray-tracing application. Calculations for the simulation can utilize the data structure of sample locations for Monte Carlo integration.

It will be appreciated that the use of the set of samples within the 2D space is not limited to rendering applications and that any algorithm or program instruction configured to utilize the sample locations is contemplated as being within the scope of the present disclosure, whether executed on a traditional single-thread or multi-thread CPU or executed on a SIMD machine such as the PPU 300.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A computer-implemented method for generating stratified two-dimensional samples, comprising:
   selecting an elementary interval associated with a stratification of a two-dimensional space;
   initializing, for the elementary interval in a memory associated with a processor, at least one data structure that indicates valid regions within the elementary interval based on sample locations corresponding with overlapping elementary intervals in a set of stratifications, wherein the at least one data structure includes a first binary tree for a first dimension and a second binary tree for a second dimension, wherein a node in the first binary tree or the second binary tree represents an overlapping elementary interval in a particular stratification in the set of stratifications related to the two-dimensional space; and
   generating, by the processor, a sample in a valid region of the elementary interval utilizing the at least one data structure to identify the valid region prior to generating the sample.

2. The method of claim 1, wherein generating the sample comprises:
   traversing each of the first binary tree and the second binary tree to generate corresponding arrays of valid offsets; and
   selecting an entry from each corresponding array of valid offsets to identify the valid region.

3. The method of claim 2, wherein generating the sample further comprises generating, either randomly or pseudo-randomly, a candidate location within the valid region.

4. The method of claim 2, wherein generating the sample further comprises:
   generating a plurality of candidate locations in the valid region;
   calculating a metric value for each candidate location in the plurality of candidate locations; and
   selecting a best candidate location from the plurality of candidate locations based on the metric value as a location for the sample.

5. The method of claim 4, wherein the metric value comprises a minimum distance between the candidate location and each sample in the zero or more other samples located within the two-dimensional space.

6. The method of claim 1, further comprising:
   updating occupancy information in the at least one data structure; and
   repeating the selecting, initializing, and generating for a different elementary interval associated with the stratification.

7. The method of claim 6, wherein a total number of samples to generate is a power of four and the stratification corresponds with elementary intervals having equal extents in both a first dimension and a second dimension of the two-dimensional space.

8. The method of claim 1, further comprising:
   storing a set of samples generated for the two-dimensional space in a memory associated with a parallel processing unit; and
   executing at least one instruction in the parallel processing unit that accesses the set of samples in the memory associated with the parallel processing unit.

9. The method of claim 8, wherein the at least one instruction is included in an algorithm for performing a transport and lighting simulation associated with ray-traced rendering.

10. A system, comprising:
    a memory; and
    a processor coupled to the memory, the processor configured to execute at least one instruction that causes the processor to:
      select an elementary interval associated with a stratification of a two-dimensional space,
      initialize, for the elementary interval in the memory, at least one data structure that indicates valid regions within the elementary interval based on sample locations corresponding with overlapping elementary intervals in a set of stratifications, wherein the at least one data structure includes a first binary tree for a first dimension and a second binary tree for a second dimension, wherein a node in the first binary tree or the second binary tree represents an overlapping elementary interval in a particular stratification in the set of stratifications related to the two-dimensional space, and generate a sample in a valid region of the elementary interval utilizing the at least one data structure to identify the valid region prior to generating the sample.

11. The system of claim 10, wherein the processor comprises a central processing unit.

12. The system of claim 10, the system further comprising a parallel processing unit coupled to the memory, wherein the parallel processing unit is configured to execute at least one additional instruction that causes the parallel processing unit to access a set of samples generated for the two-dimensional space from the memory.

13. The system of claim 10, wherein generating the sample comprises:

traversing each of the first binary tree and the second binary tree to generate corresponding arrays of valid offsets; and selecting an entry from each corresponding array of valid offsets to identify the valid region.

14. The system of claim 13, wherein generating the sample further comprises:

generating a plurality of candidate locations in the valid region;

calculating a metric value for each candidate location in the plurality of candidate locations; and selecting a best candidate location from the plurality of candidate locations based on the metric value as a location for the sample.

15. The system of claim 10, the processor further configured to:

update occupancy information in the at least one data structure; and repeat the selecting, initializing, and generating for a different elementary interval associated with the stratification.

16. The system of claim 15, wherein a total number of samples to generate is a power of four and the stratification corresponds with elementary intervals having equal extents in both a first dimension and a second dimension of the two-dimensional space.

17. A non-transitory computer-readable medium storing instructions that, when executed by at least one processor, cause the at least one processor to carry out operations for generating stratified two-dimensional samples, comprising:

selecting an elementary interval associated with a stratification of a two-dimensional space;

initializing, for the elementary interval in a memory associated with the at least one processor, at least one data structure that indicates valid regions within the elementary interval based on sample locations corresponding with overlapping elementary intervals in a set of stratifications, wherein the at least one data structure includes a first binary tree for a first dimension and a second binary tree for a second dimension, wherein a node in the first binary tree or the second binary tree represents an overlapping elementary interval in a particular stratification in the set of stratifications related to the two-dimensional space; and generating, by the at least one processor, a sample in a valid region of the elementary interval utilizing the at least one data structure to identify the valid region prior to generating the sample.

18. The computer-readable medium of claim 17, wherein generating the sample comprises:

traversing each of the first binary tree and the second binary tree to generate corresponding arrays of valid offsets; and selecting an entry from each corresponding array of valid offsets to identify the valid region.

19. The method of claim 1, wherein:

the two-dimensional space is associated with the set of stratifications, and the selected elementary interval is from a first stratification in the set of stratifications and that all stratifications in the set of stratifications divide the two-dimensional space into an equal number of equally sized areas.

20. The system of claim 10, wherein:

the two-dimensional space is associated with the set of stratifications, and the selected elementary interval is from a first stratification in the set of stratifications and that all stratifications in the set of stratifications divide the two-dimensional space into an equal number of equally sized areas.

21. The computer-readable medium of claim 17, wherein:

the two-dimensional space is associated with the set of stratifications, and the selected elementary interval is from a first stratification in the set of stratifications and that all stratifications in the set of stratifications divide the two-dimensional space into an equal number of equally sized areas.

* * * * *